US009274586B2

(12) United States Patent
Iyer et al.

(10) Patent No.: US 9,274,586 B2
(45) Date of Patent: Mar. 1, 2016

(54) INTELLIGENT MEMORY INTERFACE

(75) Inventors: Sundar Iyer, Palo Alto, CA (US); Nick McKeown, Palo Alto, CA (US); Morgan Littlewood, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/222,387

(22) Filed: Sep. 7, 2005

(65) Prior Publication Data

US 2006/0123139 A1 Jun. 8, 2006

Related U.S. Application Data

(60) Provisional application No. 60/608,237, filed on Sep. 8, 2004.

(51) Int. Cl.

| G06F 12/00 | (2006.01) |
|---|---|
| G06F 1/32 | (2006.01) |
| H04L 12/861 | (2013.01) |
| H04L 12/935 | (2013.01) |

(52) U.S. Cl.
CPC .......... *G06F 1/3209* (2013.01); *H04L 49/3036* (2013.01); *H04L 49/90* (2013.01); *H04L 49/3009* (2013.01)

(58) Field of Classification Search
CPC ... G06F 1/3209; H04L 49/90; H04L 49/3009; H04L 49/3036
USPC ................................................. 711/154, 170
See application file for complete search history.

(56) References Cited

U.S. PATENT DOCUMENTS

| 6,081,883 | A | * | 6/2000 | Popelka et al. ................ 712/28 |
|---|---|---|---|---|
| 6,874,039 | B2 | * | 3/2005 | Ganapathy et al. ............ 710/28 |
| 7,441,087 | B2 | * | 10/2008 | Hakura et al. ................ 711/137 |
| 7,536,495 | B2 | * | 5/2009 | Ashmore et al. ............. 710/313 |
| 2002/0122386 | A1 | * | 9/2002 | Calvignac et al. ............ 370/230 |
| 2005/0114581 | A1 | * | 5/2005 | Azadet et al. ................. 710/305 |

\* cited by examiner

*Primary Examiner* — Matthew Bradley
(74) *Attorney, Agent, or Firm* — Meunier Carlin & Curfman LLC

(57) ABSTRACT

Many computer processing tasks require large numbers of memory intensive operations to be performed very rapidly. For example, computer network requires that packets be placed into and removed from First-In First-Out (FIFO) queues, numerous counters to be maintained and routing table look-ups to be performed. All of these operations must be performed at very high-speeds in order to keep up with today's high-speed computer network traffic. To help perform these high-speed memory tasks, a high-speed intelligent memory subsystem has been developed. The high-speed intelligent memory subsystem handles the intricacies of these memory operations such that a main process is relieved of some of its duties. Various different high-level memory interfaces for interfacing with the intelligent memory subsystem. The memory interfaces may be hardware-based or software-based. In one embodiment, two layers of interfaces are implemented such that an internal interface may evolve over successive generations without affecting an externally visible interface.

12 Claims, 24 Drawing Sheets

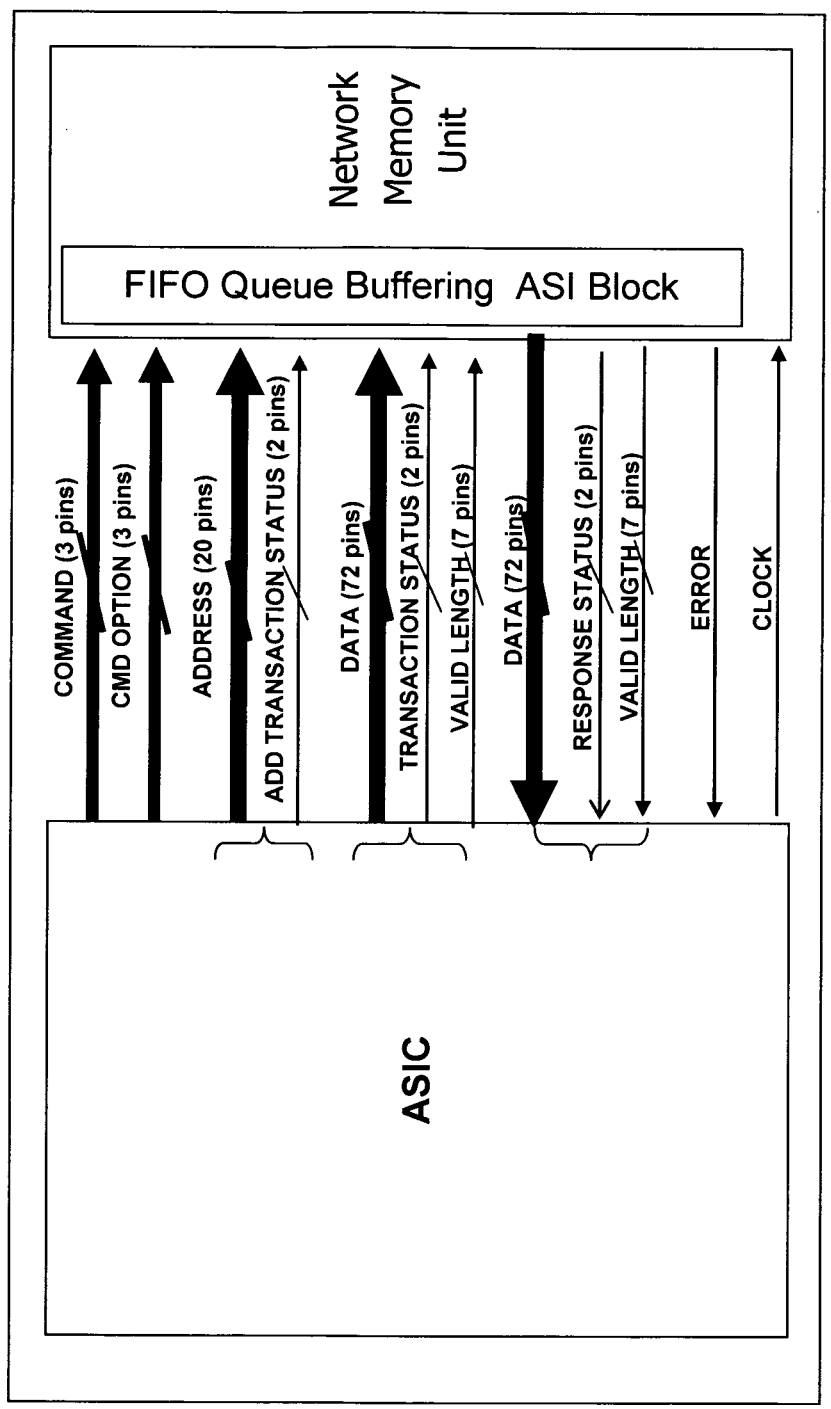
Figure 3C –
FIFO Queue Buffering ASI

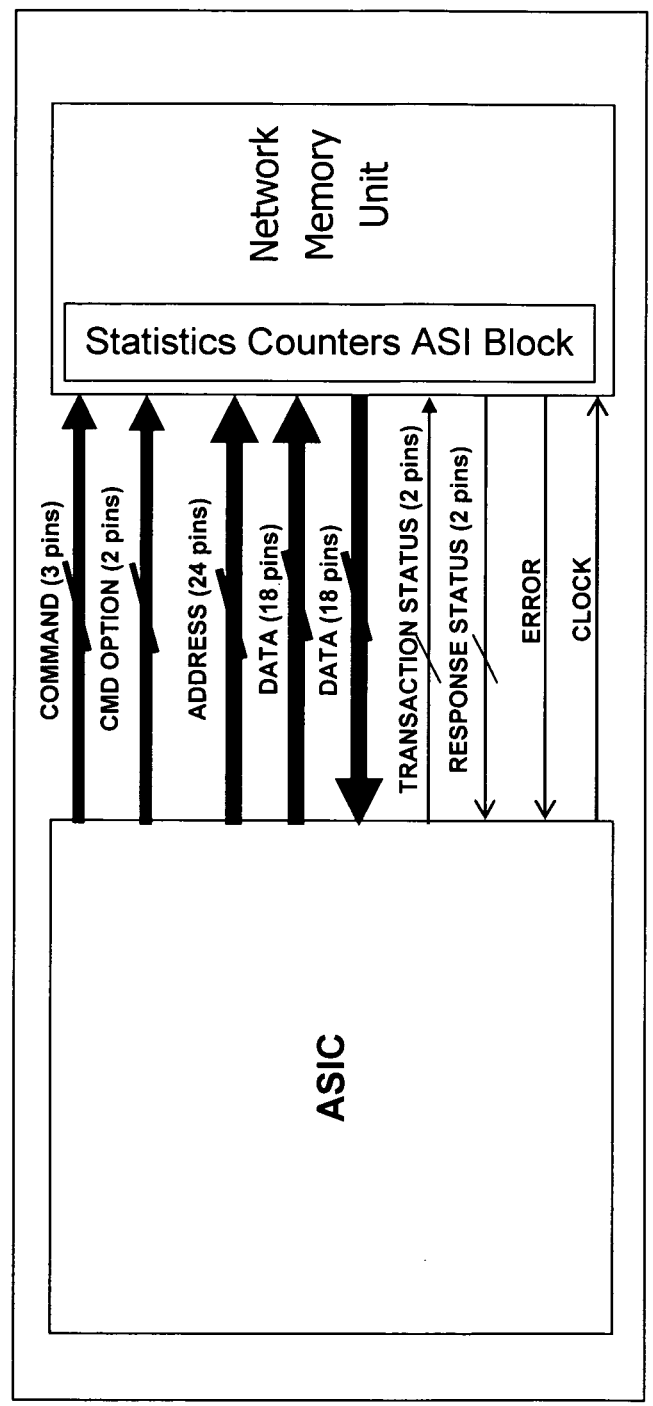
Figure 3D –
Statistical Counters ASI

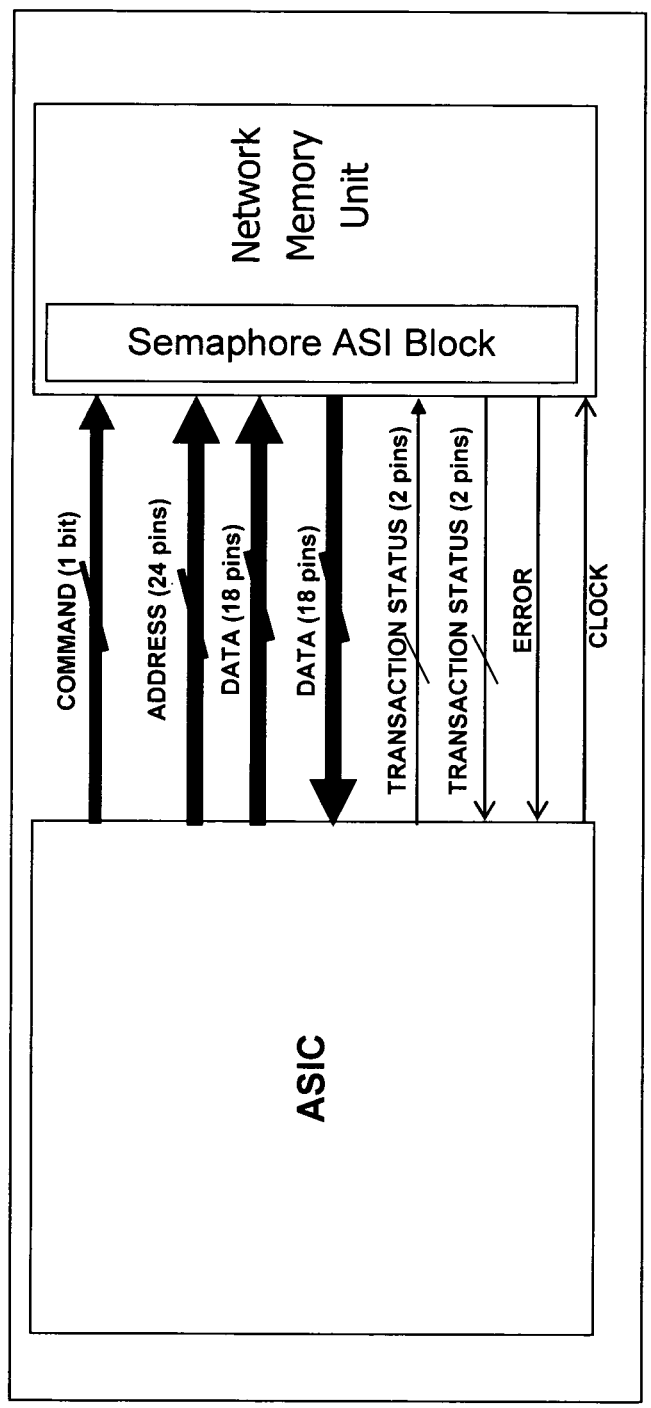
Figure 3E –
Semaphore ASI

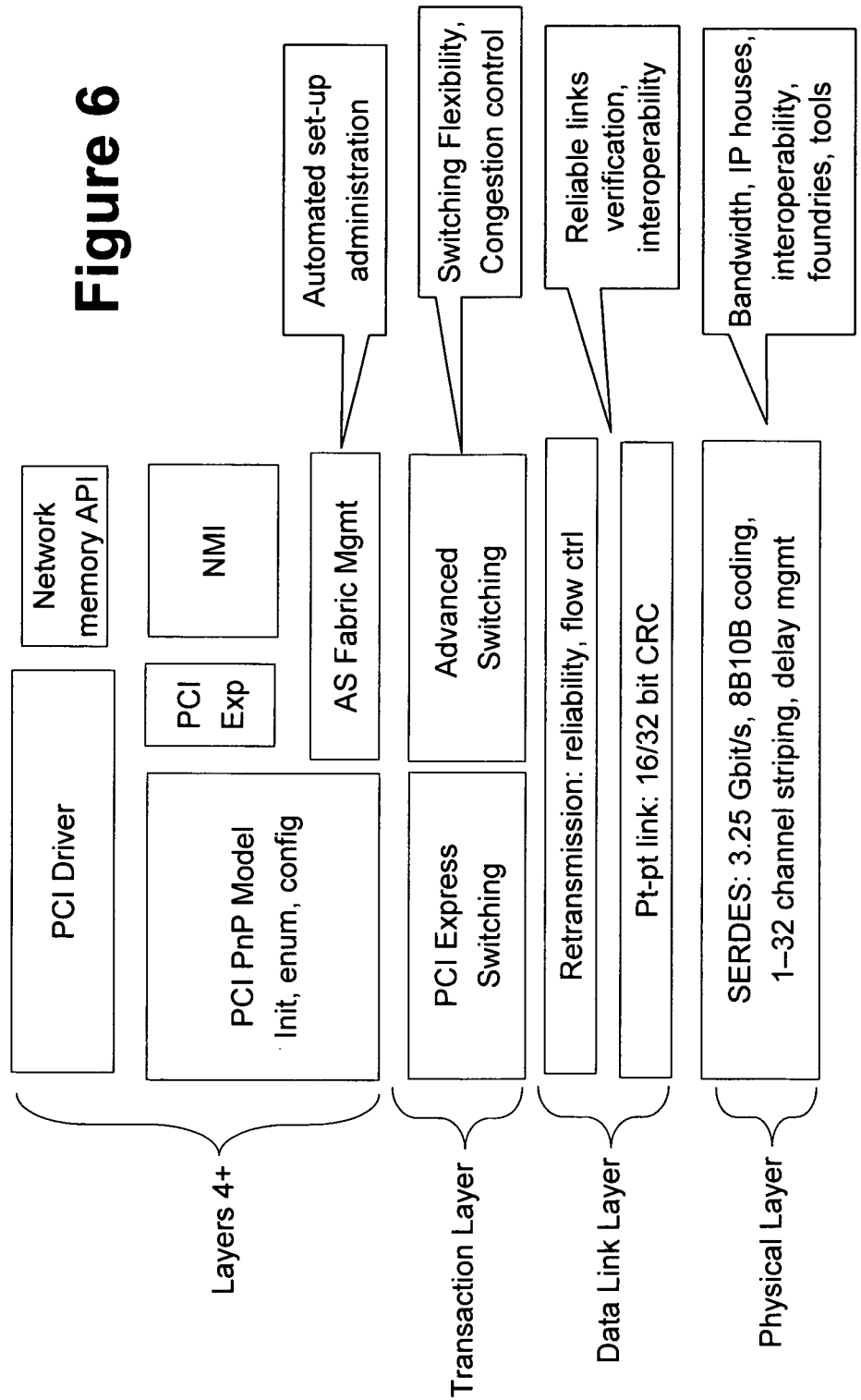

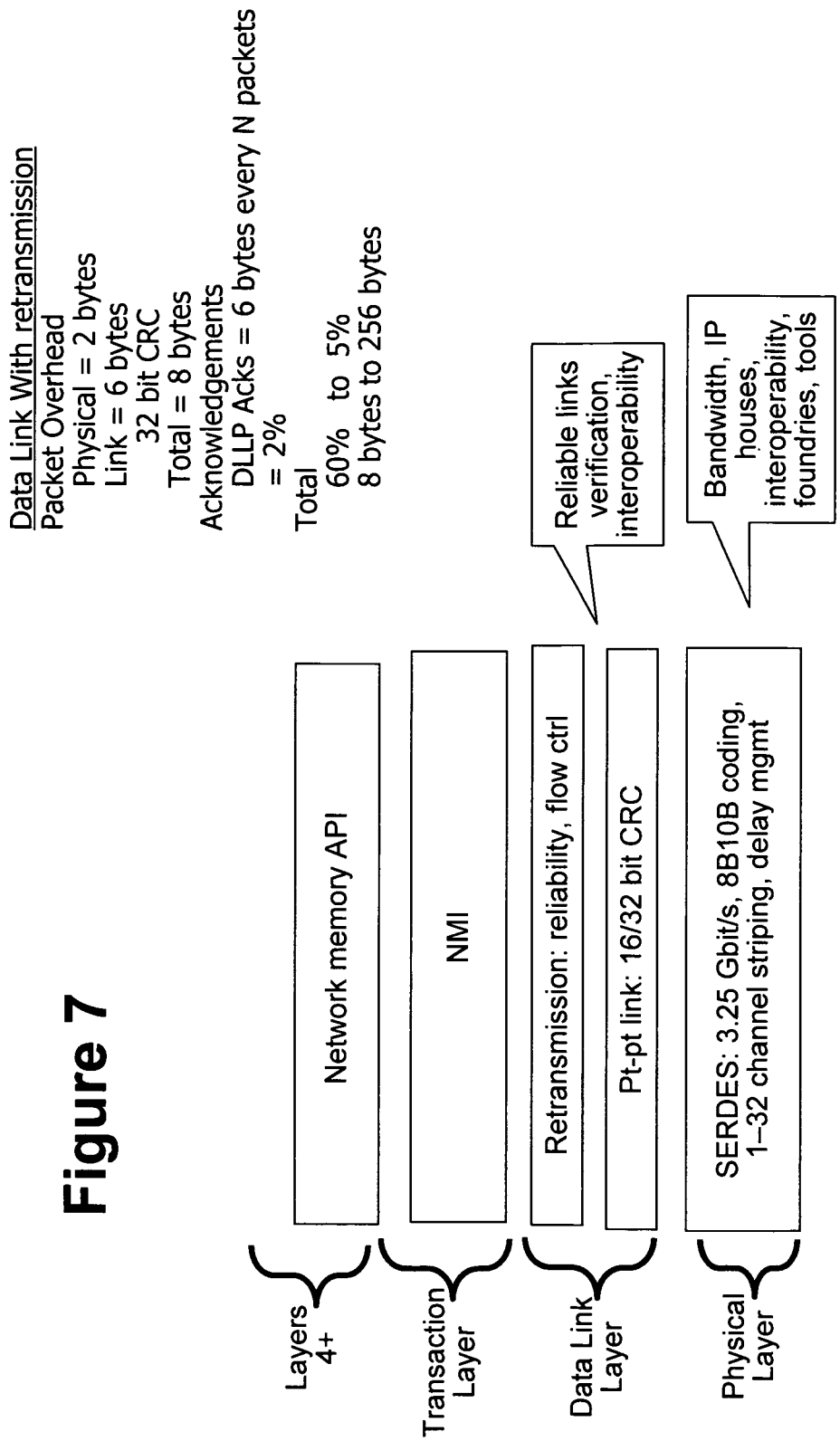

Figure 11 - NMI Simple Packet

INTELLIGENT MEMORY INTERFACE

RELATED APPLICATIONS

The present patent application claims the benefit of the previous U.S. Provisional Patent Application entitled "Intelligent Memory Interface" filed on Sep. 8, 2004 having Ser. No. 60/608,237. The present patent application also hereby incorporates by reference in its entirety the U.S. patent application entitled "High Speed Memory Control and I/O Process System" filed on Dec. 17, 2004 having Ser. No. 11/016,572.

FIELD OF THE INVENTION

The present invention relates to the field of memory control subsystems. In particular the present invention discloses application programming interfaces and protocols for high-speed memory subsystems.

BACKGROUND OF THE INVENTION

Modern digital networking devices must operate at very high speeds in order to accommodate ever increasing line speeds and large numbers of different possible output paths. Thus, it is very important to have a high-speed processor in a network device in order to be able to quickly process data packets. However, without an accompanying high-speed memory system, the high-speed network processor may not be able to temporarily store data packets at an adequate rate. Thus, a high-speed digital network device design requires both a high-speed network processor and an associated high-speed memory system.

In addition to the high-performance required, networking applications place a wide variety of memory demands on their associated memory systems. For each packet that passes through a network router that packet must be buffered such that high-speed packet-buffering services are needed. Each packet must also be routed such that very frequent routing table look-ups must be performed to determine where each packet will travel on its next network hop. Each packet will also cause a number of statistics counters to be affected such that these statistics counters must be updated. All of this packet-buffering, table look-ups, and statistics counter memory operations must be performed at very high-speeds.

To provide adequate memory services for such demanding network applications, traditional network routers generally employ multiple different types of memory technology coupled to a network processor. A high-speed network device may contain a network processor that is coupled to three or more different types of memory subsystems. For example, a first memory system may be used for packet-buffering, a second memory system may be used for storing statistics counters, and a third memory system is used for storing look-up tables. Such a memory arrangement is very complex and cumbersome. That type of memory arrangement requires an individual connection to each different type of memory such that many input/output pins are required on the network processor and the printed circuit board layout due to the multiple memory buses. Furthermore, such a memory arrangement may use a large amount of memory such that the memory system will be expensive to implement, consume large amounts of power, and require significant amounts of printed circuit board area.

Due to the overwhelmingly complexity and high cost of conventional memory systems for high-speed network devices, it would be desirable to find an improved method of creating high-speed memory systems for network devices that require a large variety of memory services at very high speeds. Ideally, such a memory system would provide a consistent memory interface that would provide all of the different types of memory services needed by network devices.

SUMMARY OF THE INVENTION

The present invention introduces various high-level memory interfaces for interfacing with an intelligent memory system. The memory interfaces may be hardware-based or software-based. In one embodiment, two layers of interfaces are implemented such that an internal interface may evolve over successive generations without affecting an externally visible interface.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 3C illustrates the types of signals that will commonly be used in a hardware-based FIFO queue buffering interface.

FIG. 3D illustrates the types of signals that will commonly be used in a hardware-based statistical counters interface.

FIG. 3E illustrates the types of signals that will commonly be used in a hardware-based semaphore interface.

FIG. 6 illustrates a network memory interface implemented on the Advanced Switching layer of a PCI Express communication stack.

FIG. 7 illustrates a network memory interface implemented on the Data Link layer of a PCI Express communication stack with retransmission capability.

DETAILED DESCRIPTION OF THE PREFERRED EMBODIMENT

Methods and apparatuses for implementing high-speed memory systems for digital computer systems are disclosed. For example, a number of memory system interface techniques are disclosed. In the following description, for purposes of explanation, specific nomenclature is set forth to provide a thorough understanding of the present invention. However, it will be apparent to one skilled in the art that these specific details are not required in order to practice the present invention. Similarly, although the present invention is mainly described with reference to packet-switched network processing applications, the same techniques can easily be applied to other types of computing applications. For example, any computing application that uses FIFO queues may incorporate the FIFO queue methods and apparatus teachings of the present invention.

An Intelligent Memory System

High-speed digital networking applications place very heavy demands on memory systems. For each data packet that passes through a network device such as a network router, that data packet must be buffered, routing tables that specify where the data packet will travel must be consulted, and statistics counters affected by the data packet must be updated. All of these operations require memory accesses that must be performed at very high-speeds.

Figure 1A:
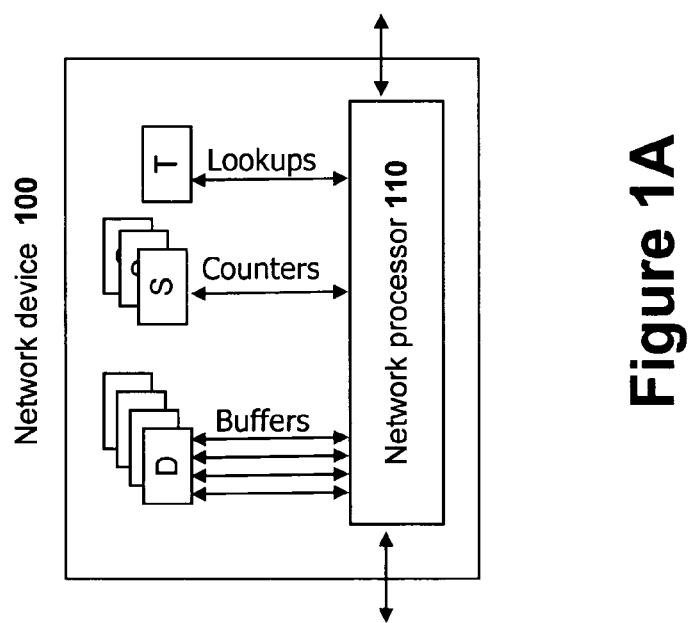
FIG. 1A illustrates a network device that uses multiple single function memories.

To provide memory services for such applications, network routers generally employ multiple different types of memories. FIG. 1A illustrates a high-level block diagram of a network device 100 that contains a network processor 110 coupled to three different types of memory. Specifically, a first memory system is used for packet-buffering. The packet-buffering memory system may be constructed with conventional DRAM if the network speeds are slow enough. However, today's high-speed networks often require a specialized low-latency DRAM or SRAM is needed to handle the higher packet rates. A second memory system (possibly SRAM) is used for storing statistics counters that keep track of the network traffic. Finally, a third memory system (possibly conventional DRAM or a specialized low-latency DRAM) is used for storing look-up tables such as network routing tables.

The memory arrangement of FIG. 1A is very complex and cumbersome since it may use many different memory types, memory interfaces, and memory chips. For example, the memory arrangement of FIG. 1A requires a different type of connection for each different type of memory that is used. Such a design requires a very large number of pins on the network processor 110. Furthermore, the large number of memory connections makes the printed circuit board layout difficult due to the large number of different memory buses. Furthermore, the memory arrangement of FIG. 1A uses a large amount of memory such that the memory system will be costly, consume large amounts of power, generate significant amounts of heat, and require sizable amounts of printed circuit board area.

Figure 1B:
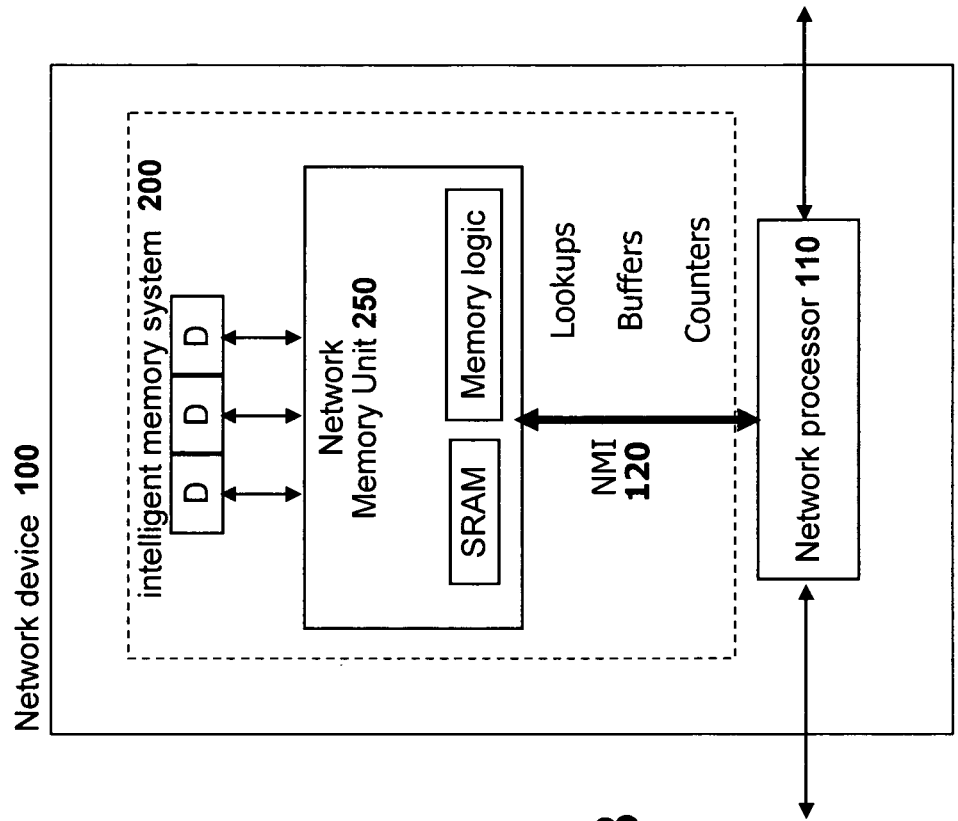
FIG. 1B illustrates network device that uses a specialized network memory system.

To provide memory services in a more efficient manner, an intelligent memory subsystem has been introduced. FIG. 1B illustrates a high-level block diagram of an intelligent memory subsystem 200 implemented within a network device 100 such as a network router. The intelligent memory subsystem 200 of FIG. 1B provides a single memory interface to the network processor 110 for all of the network processor's memory services. In one embodiment, the intelligent memory subsystem 200 uses a specially designed Network Memory Interface (NMI) 120. Memory operations for packet-buffering, table look-ups, and statistics counters can all be handled by the single Network Memory Interface (NMI) 120. Thus, the need for multiple memory interfaces is eliminated. The Network Memory Interface (NMI) 120 that couples the intelligent memory subsystem to the network processor 110 has been optimized to efficiently use the bandwidth.

The intelligent memory subsystem 200 of FIG. 1B contains sophisticated memory logic in order to provide high-level memory services beyond simple write-to memory and read from memory. For example, the intelligent memory subsystem 200 of FIG. 1B contains logic to provide abstracted First-In First-Out (FIFO) queue services to the network processor 110. The First-In First-Out (FIFO) queue services allow the network processor 110 to specify a logical queue number and provide a command to access the FIFO queue.

By providing high-level memory services, the intelligent memory subsystem 200 offloads some work normally performed by the network processor 110. For example, to maintain multiple FIFO queues, the network processor 110 would normally need to maintain a set of linked lists by allocating memory as needed and keeping track of pointers connecting the items in the various linked lists. Thus, the task of the network application running on the network processor 110 is simplified. As demonstrated, networking applications are an ideal application for the intelligent memory system, this document will use the terms intelligent memory system and network memory system interchangeably.

By providing high-level memory services, the memory subsystem can be optimized to most efficiently perform those high-level memory services. Thus, an intelligent memory subsystem may implemented in a hierarchical memory system that stores frequently accessed information in a local high-speed memory (such as SRAM) while less frequently accessed information can be placed into less expensive slower-speed memory (such as DRAM). Such a design reduces the cost of the system. Many additional details about implementing an intelligent memory system can be found in the U.S. patent application entitled "High Speed Memory Control and I/O Process System" filed on Dec. 17, 2004 having Ser. No. 11/016,572.

Network Memory Interfaces

Figure 2A:
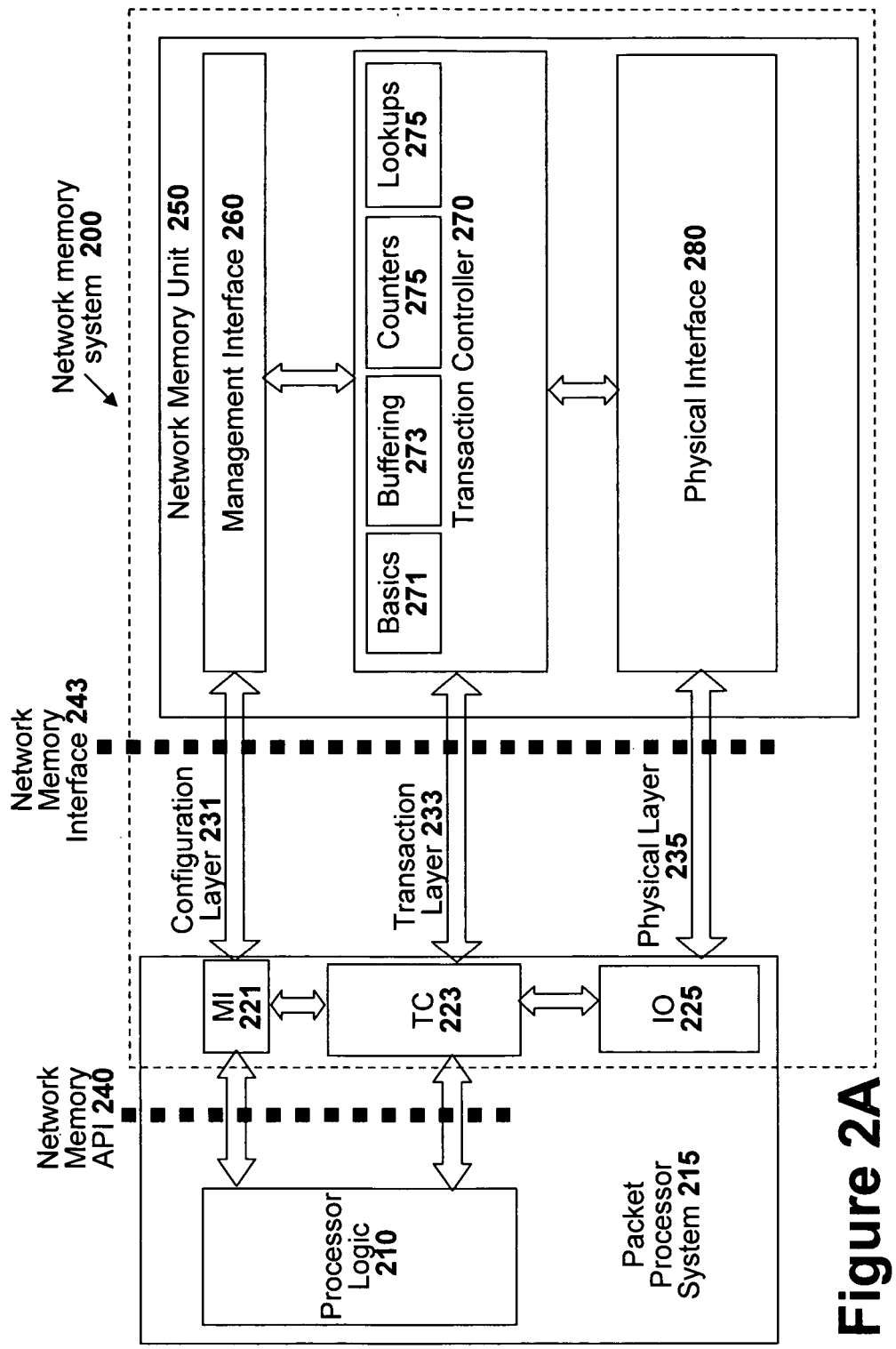
FIG. 2A illustrates a block diagram of an intelligent memory system that uses two independent interface layers.

To simplify the task of designing network devices, the network memory system provides a consistent and easy-to-use network memory application programming interface (API). FIG. 2A illustrates a block diagram of a network memory system 200 with a network memory API 240. The network memory API 240 provides a large set of memory services to network processor 210. The memory services may range from traditional read/write memory services to abstracted First-In First-Out (FIFO) queue services and automatic updating counters. The network memory API 240 may be considered to include two interfaces: a management interface (MI) and a transaction interface. The management interface (MI) 221 allows the network processor 210 to configure and maintain the intelligent network memory subsystem 200. The transaction interface allows the network processor 210 to make memory service requests by communicating with a transaction controller 223.

In one embodiment, the memory service requests received on the network memory API 240 are processed and related commands are sent across a second interface known as the network memory interface 243 to a network memory unit 250. Note that there is not necessarily a one-to-one mapping of requests on the network memory API 240 and the network memory interface 243. Thus, a request on the network memory API 240 may translate into zero, one, or multiple corresponding requests on the network memory interface 243 to a network memory unit 250. The network memory interface 243 allows the network memory unit 250 to be physically separate from the network processor. Furthermore, if the network memory interface 243 is carried on a switched bus then multiple instances of network memory units may be used on the same switched bus.

In the embodiment of FIG. 2A, the network memory interface 243 is divided into three layers. The top layer of the network memory interface 243 is a configuration layer 231. The configuration layer 231 is used to carry configuration information to a management interface 260 in the network memory unit 250. The configuration information enables the network memory unit 250 to allocate its memory resources according to the requests of the network processor 210.

The second layer of the network memory interface 243 is a transaction layer 233. The transaction layer 233 is the main communication layer used during operation of the network memory system 200. For example, the routine memory service requests for basic read/write memory services, FIFO queue buffering services, statistic counter services, and table look-up services all take place on the transaction layer 233 of the network memory interface 243.

The bottom layer of the network memory interface 243 is a physical layer 235 for carrying the information communicated on the higher layers. In one embodiment, the physical layer 235 comprises a high-speed serial bus. The bus may comprise physical and link layers as provided by a PCI Express bus or some other SERDES (Serializer/Deserializer) based bus. Encoded request and response packets may be carried by the high-speed serial bus.

The use of two successive interface layers, the network memory API 240 and the network memory interface 243, provides a number of advantages for the network memory system 200. For example, by having the second interface that is internal to the network memory system 200, the network memory system 200 may evolve over successive generations internally while keeping a consistent application programming interface to the network processor 210 with the higher-level network memory API 240. In this manner, the physical layer 235 may be changed from one bus technology to another, the protocol in transaction layer 233 may be expanded, and additional configuration information may be added to the configuration layer 231 without modifying the network memory API 240 presented to the network processor 210.

Another advantage of the two layer interface system is that multiple different network memory application programming interfaces (APIs) 240 may be presented to network device designers that design in different environments without changing the details of the internal network memory interface 243. For example, both a hardware-based interface and a software-based interface may be supported on the network memory API 240. The hardware and software interfaces to the network memory services could be translated in the format needed by the internal network memory interface 243.

Hardware Interface to Network Memory

Figure 2B:
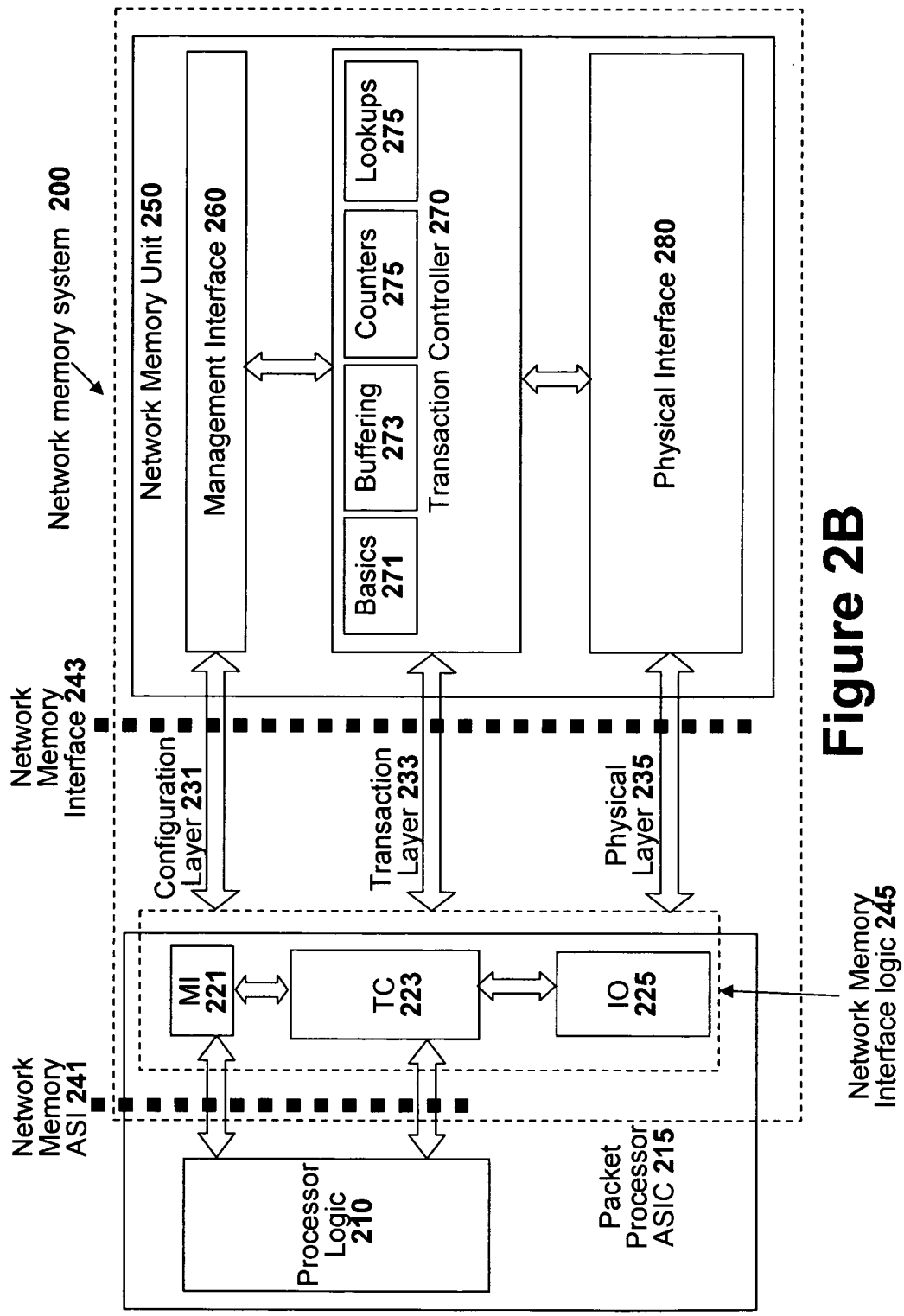
FIG. 2B illustrates the intelligent memory system of FIG. 2A with a first memory service interface (ASI) that comprises a hardware interface.

FIG. 2B illustrates a first embodiment network memory API that consists of a hardware interface for Application Specific Integrated Circuit (ASIC) designers. Specifically, the network memory API may take the form of a hardware-based network memory Application Specific Interface (ASI) 241 that defines a set of hardware interfaces for requesting memory services.

In the embodiment of FIG. 2B, the hardware interface comprises a library of network memory interface logic 245 that may be incorporated into networking ASIC logic. The circuits in the network memory interface logic 245 handle all processing necessary to send and receive information across the network memory interface 243 in the network memory interface protocol. Specifically, the circuits in the network memory interface logic 245 translate all hardware requests from the processor logic 210 into packets that will travel on the network memory interface 243. Translation of hardware-based network memory ASI requests into packet requests is very useful if an external memory controller needs to be supported.

Figure 2C:
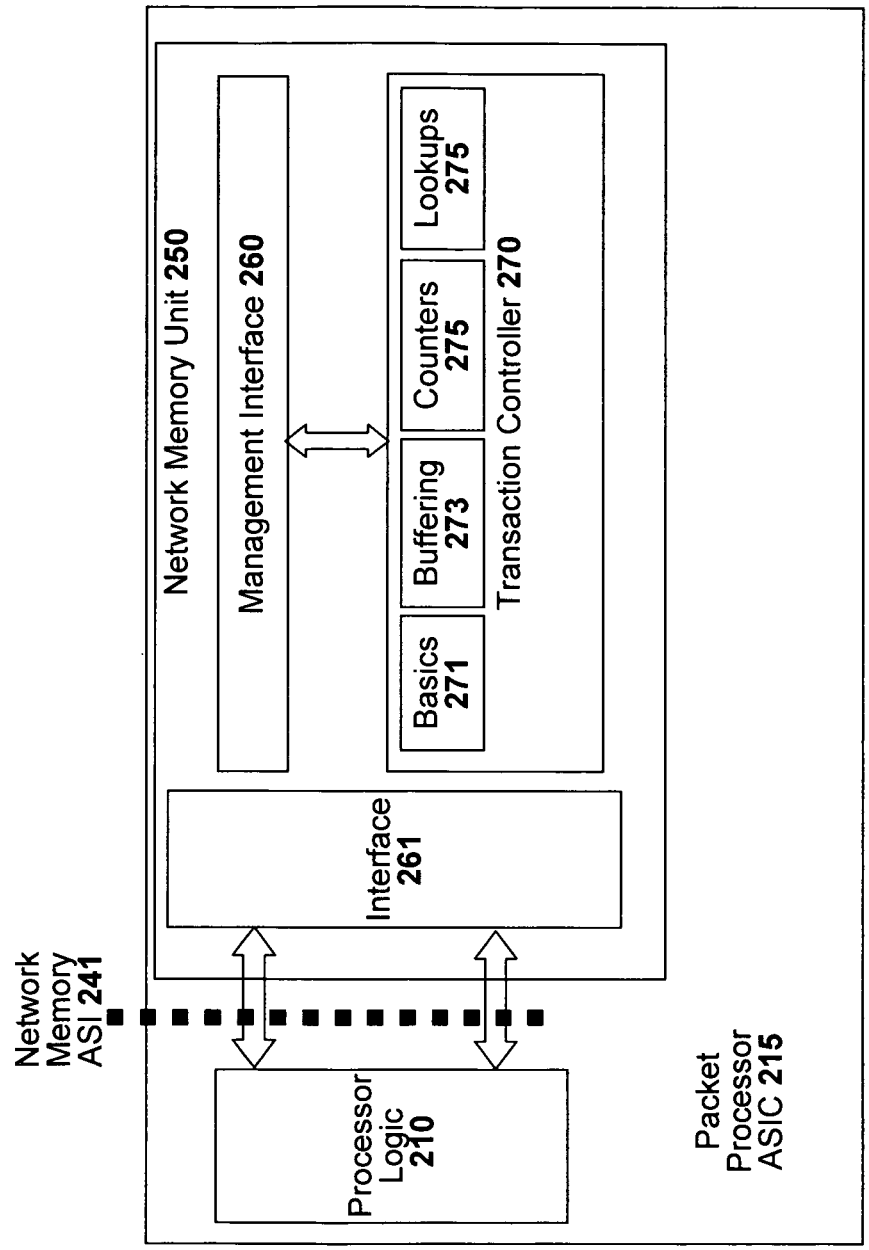
FIG. 2C illustrates the intelligent memory system of FIG. 2A with a second memory service interface (NMI) that comprises a hardware interface.

FIG. 2C illustrates an alternate embodiment of a network memory ASI 241. In the embodiment of FIG. 2C, the hardware-based requests received on the network memory ASI 241 is interpreted (or decoded) by an interface 261 within the network memory unit 250 and then directly acted upon by the management interface 260 and transaction controller 270 in the network memory unit 250. In such an embodiment, the latency that would have been incurred by translating a hardware-based request into an NMI packet-based request is eliminated. The embodiment of FIG. 2C is the type of interface that would be used if the network memory unit is implemented in the form of an embedded IP library used within a network processor or ASIC.

The network memory ASI 241 should present a simple interface to the processor logic in an ASIC that will directly access memory services. The network memory ASI 241 is "application specific" so that each logic module in an ASIC (buffering module, counter module) etc. can independently interface with the network memory chips. Thus, there would be distinct ASI interfaces for buffering, counters, semaphores, etc. Every different ASI interface should allow compatibility with a memory interface in order to support raw reads/writes. In one embodiment, the hardware-based ASI is an asynchronous interface where command requests and request results flow independently. Such an embodiment is capable of supporting a variety of operations with varying latency characteristics. Ideally, a hardware-based ASI should support variable length data transactions. Furthermore, the hardware-based ASI should have minimal overhead so as to minimize the read latency of transactions. Details on one hardware-based ASI will be presented in a later section of this document.

Software Interface to Network Memory

Figure 2D:
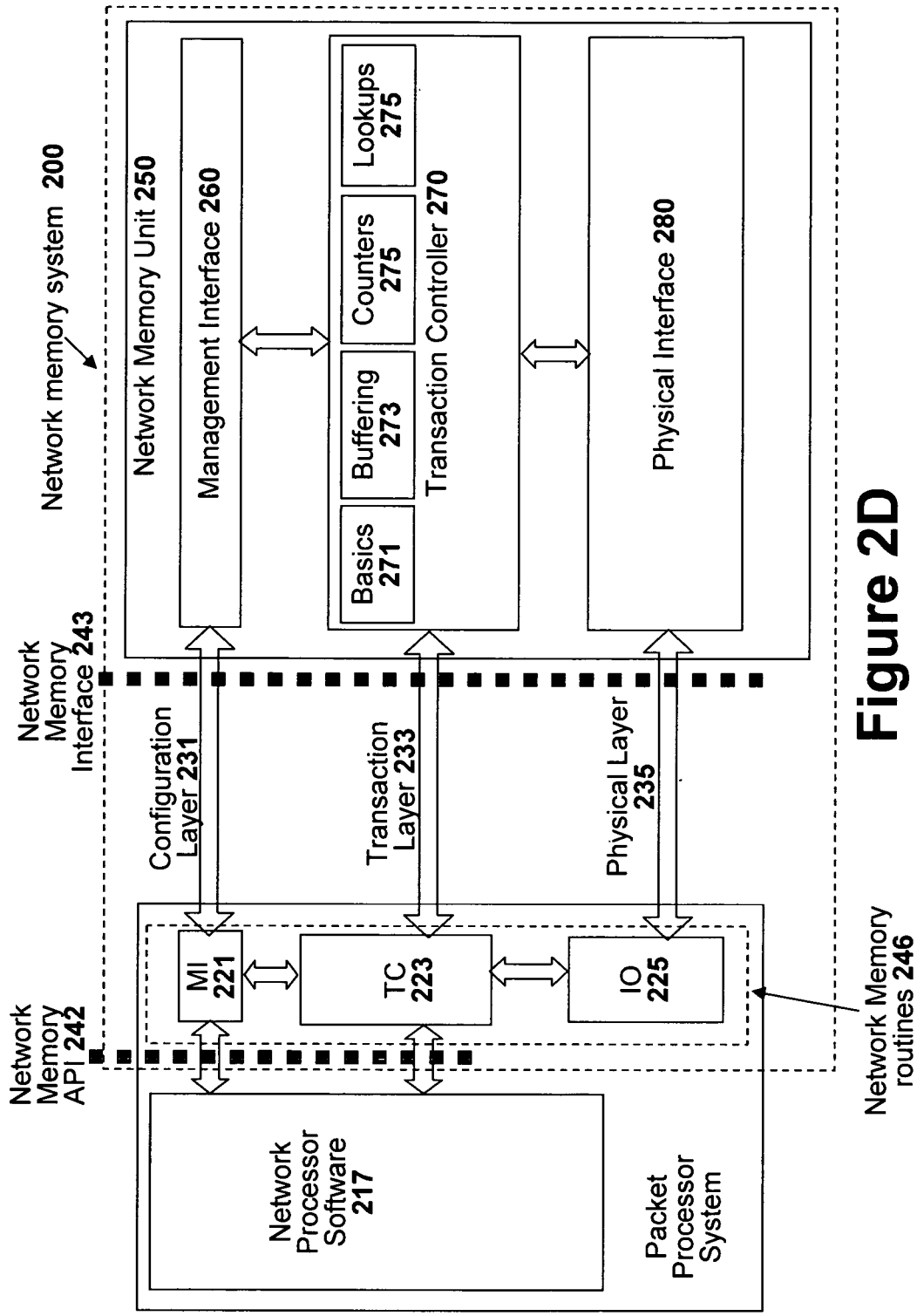
FIG. 2D illustrates the intelligent memory system of FIG. 2A wherein the memory service interface comprises a first software application programming interface.

FIG. 2D illustrates an embodiment of the network memory API that consists of a software-based network memory API 242. The software-based network memory API 242 allows network processor programmers to easily make memory service requests. The network memory API 242 could take the form of a library of network memory routines 246 that may be called. The network memory routines in the library would handle all communication across the network memory interface 243. The software network memory API 242 may comprise source code that may be compiled with the network processor programmer's code, a library of object code routines that may be linked to the network processor code, a set of routines that may be accessed via message passing, a set of methods in an object-oriented object, or any other software communication means.

Figure 2E:
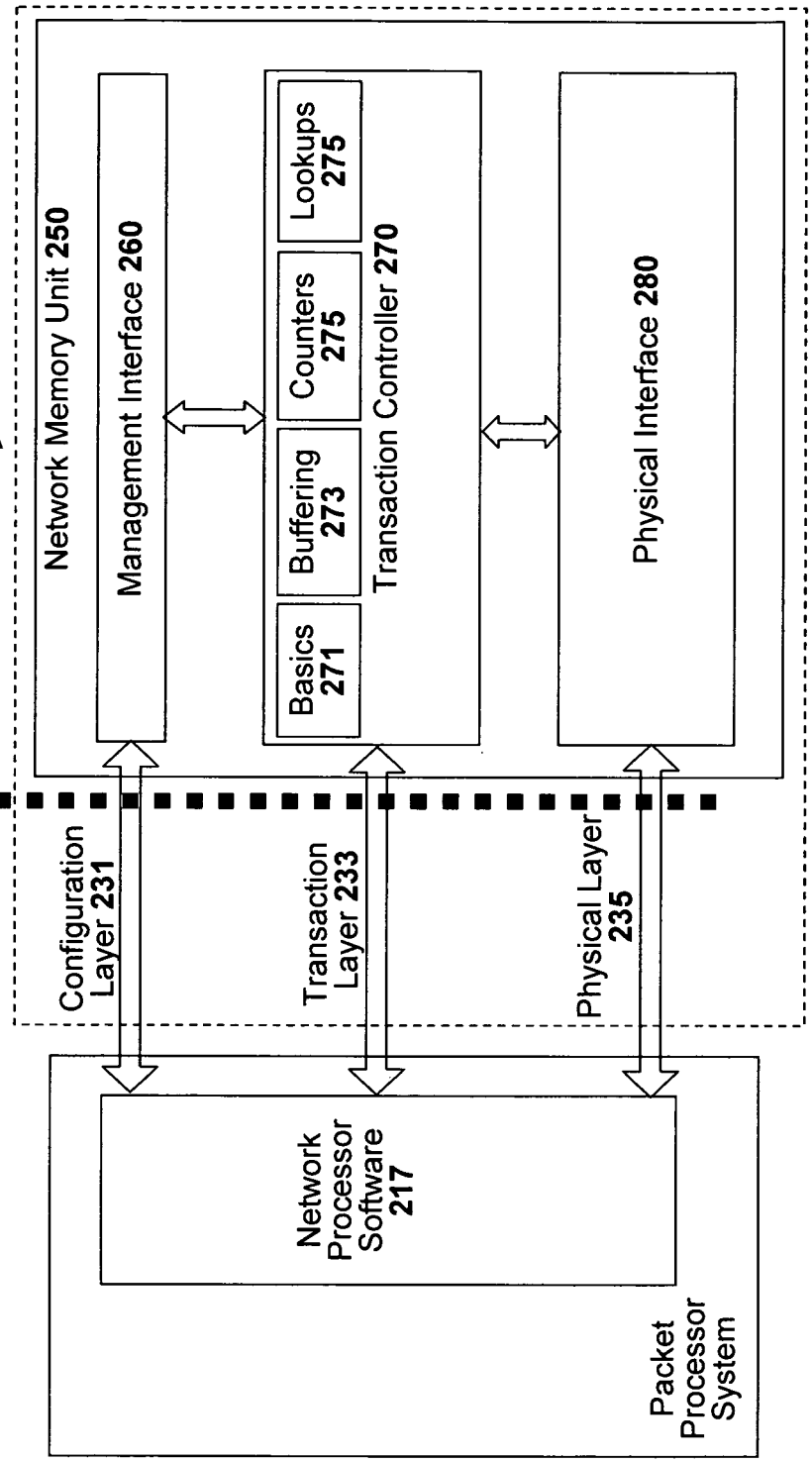
FIG. 2E illustrates the intelligent memory system of FIG. 2A wherein the memory service interface comprises a first software application programming interface.

If a network device designer decides to learn the details of the network memory interface 243 then the network device designer may elect to directly access the memory services via the lower-level network memory interface 243. FIG. 2E illustrates an embodiment of network device wherein a designer has decided to directly access memory services using the network memory interface 243. By directly accessing the network memory interface 243, a designer may create a very efficient interface system since there is no interface translation. For example, if the network memory interface 243 comprises an interface that uses encoded memory service packet requests, then a designer may choose to encode his own memory service packets to directly interface with the network memory unit 250 without any additional overhead.

Dual Interface to Network Memory

Figure 2F:
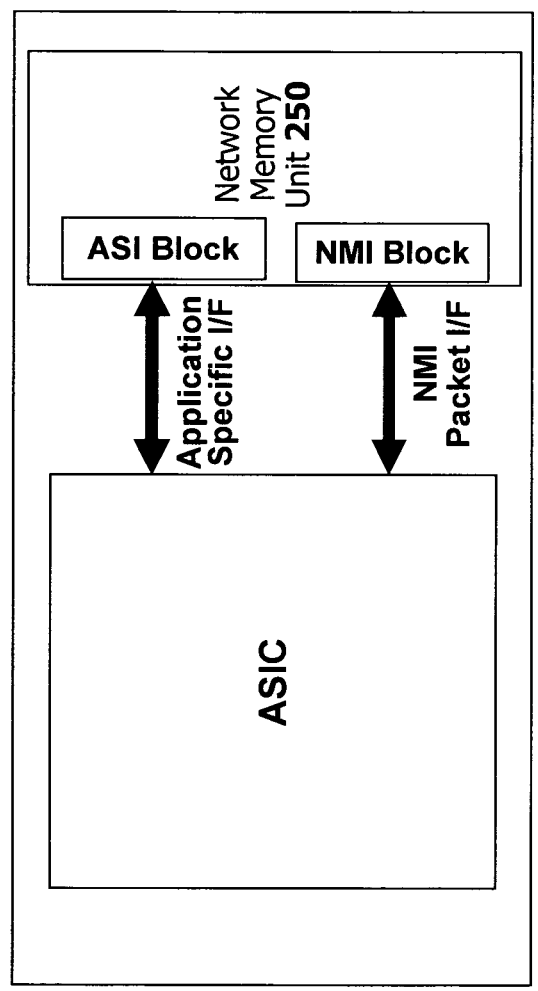
FIG. 2F illustrates the intelligent memory system of FIG. 2A wherein the memory service interface comprises both a software application programming interface and a hardware interface.

To provide flexible design choices to a network device designer, an ideal network memory system may provide both a higher-level API interface and a lower-level NMI packet interface to the network memory system. FIG. 2F illustrates an example embodiment of the network memory system that provides both a higher-level Application Specific Interface (ASI) and a lower-level NMI packet interface. While it is expected that most network designers will opt to use the higher-level ASI interface, a network device designer (especially a designer that is using a network processor and can write code), may choose to directly use the NMI packet format to prevent conversion from one format to another.

Note that the higher-level ASI Block may or may not translate memory requests into NMI packet-based requests as set forth in FIGS. 2B and 2C, respectively. Similarly, the lower-level NMI packet interface may use a set of memory service software routines or a direct packet interface as set forth in FIGS. 2D and 2E, respectively. In one preferred embodiment, the higher level ASI is implemented in parallel to the lower-level NMI packet interface (without any translation) since forcing the higher-level ASI to translate requests into NMI packet-based requests would cause undesired latency.

Higher-Level Interface Embodiment

The network memory higher-level ASI may be implemented in a number of different ways. This section defines one possible method of implementing a hardware-based interface.

In one embodiment of a hardware-based ASI, each application block within an ASIC (buffering, counters, etc.) executes memory service requests via the application block's own dedicated ASI interface. For example, FIG. 3A illustrates a network memory system wherein a buffering application block in an ASIC accesses memory services via a buffering ASI and a counters application block in the ASIC accesses memory services via a counters ASI.

Figure 3A:
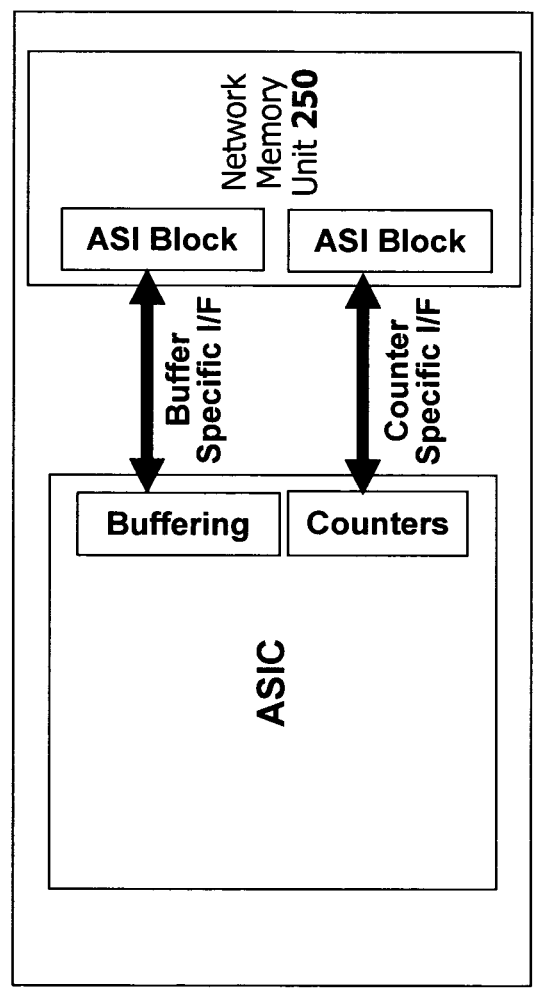
FIG. 3A illustrates a network memory system wherein different hardware blocks access memory services with different interfaces.

In the embodiment of FIG. 3A, the hardware-based ASI for a particular application is designed specifically for that application block. The specific ASI implements the functionality of the associated NMI memory requests for that application block. The hardware-based ASI is asynchronous such that the ASIC sends commands, while the network memory unit responds with results on its data interface independently.

Common Format of Application Specific Interface (ASI)

Figure 3B:
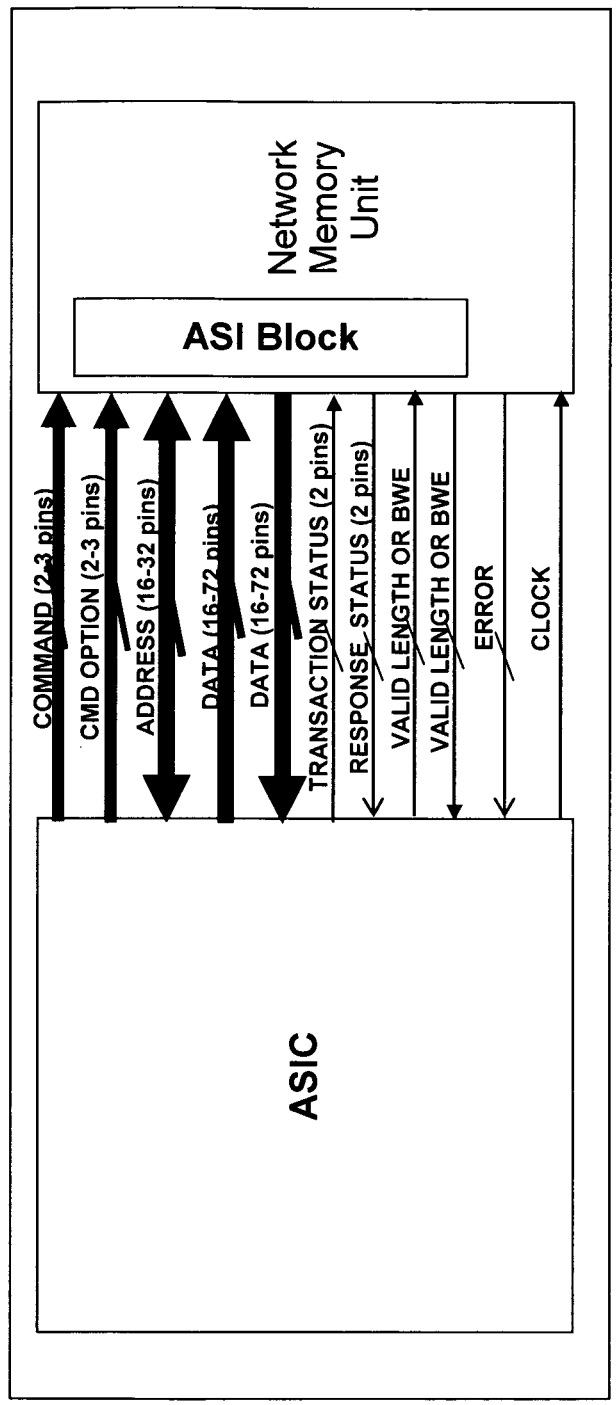
FIG. 3B illustrates the types of signals that will commonly be used in a hardware-based interface.
Figure 4:
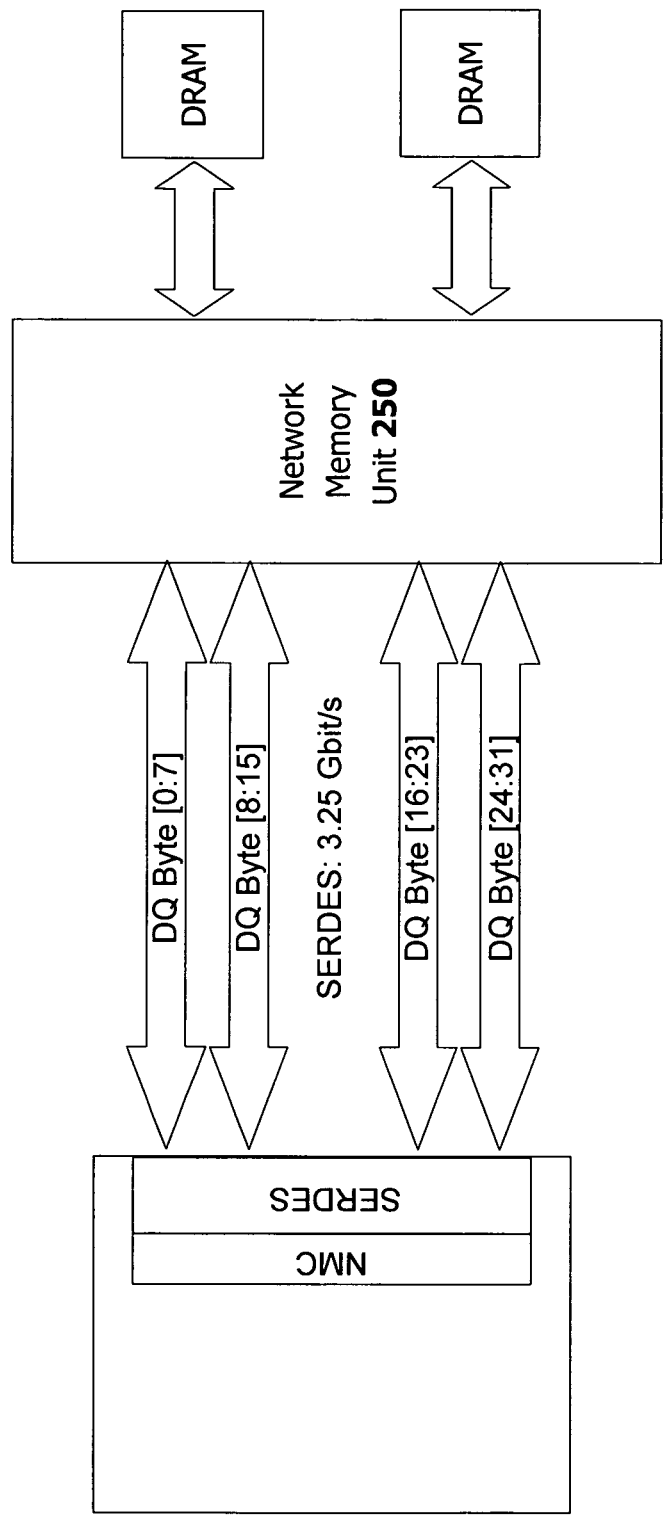
FIG. 4 illustrates a block diagram of a network memory system that uses a Serializer/Deserializer (SERDES) interface.

While each hardware-based ASI is specific to one application (buffering, counters, etc.), there are characteristics which are common amongst individual hardware-based Application Specific Interfaces. FIG. 3B illustrates one list of the types of signals that will commonly be used in a hardware-based Application Specific Interface (ASI). Depending on the specific application (buffering, counters etc.), one or more of the signals illustrated in FIG. 3B may not be present. Furthermore, the size of the interfaces and clock speeds differ.

The following list defines the signals on the hardware-based interface illustrated in FIG. 3B:

COMMAND TYPE (I): 2-3 pins
    Used to denote the different commands for that application
COMMAND OPTION (I): 2-3 pins
    Used to denote the option for a command
DATA BUS (Separate bus for reads/writes or common bus) (I/O): 18-64 pins
    To carry data for commands like packet payload, packet header, counter value etc.
ADDRESS BUS (I): 16 pins
    Used to carry the address such as counter number, queue number, etc.
    There may or may not be an address bus in the reverse direction to specify the queue number of the packet being requested.
TRANSACTION STATUS (I) & RESPONSE STATUS (O): 2 pins
    Denotes the status of a transaction or response
        00: Idle
        01: Start (and more transaction data coming)
        10: Valid
        11: End of transaction
    For some Application Specific Interfaces the address interface may need a separate transaction status pin pair
LENGTH OR BWE (Separate I and O): 2-9 pins
    Used to denote the length of the valid data written on the data bus
    Can also be used as a byte wide enable to maintain compatibility to a memory interface
ERROR (O): 1 pin
    Used to signal an error
CLOCK: 1 pin
    Clock supporting speeds from 100 MHZ-400 MHz
FIFO Queue Buffering Application Specific Interface (ASI)

FIG. 3C illustrates the signals used in one implementation of a FIFO queue buffering ASI. In one embodiment, with a clock Speed of 250 MHz, the FIFO queue buffering ASI of FIG. 3C allows up to 250 M queues to be addressed per sec per. Note that the Length/BWE pins are needed as buffer transactions are not fixed length. In one particular embodiment, the buffering API uses a channel identifier interface (not shown) to implement a buffering system with multiple channels.

The following list defines the signals on the hardware-based FIFO queue buffering ASI illustrated in FIG. 3C:

Command Type (I): 3 pins
 To denote 6 different command types
  000—Raw Read
  001—Raw Write
  010—Write_Queue
  011—Read_Queue
  100—Prepend_and_move
  101—Drop
Command Option (I): 3 pins
 To specify segment type in write_queue
 To specify read type in read_queue
 To specify movetype in prepend_and_move
 To specify droptype in drop
Data Bus (Separate I and O): 144 pins
 To carry data payload for commands
 72 pins in each direction
  Variable length packet data for write_queue
  Variable length packet header for prepend_and_move
  Num packets for drop
  Variable length results for commands
LENGTH (Separate I and O bus): 14 pins
 Specifies the length in bytes of the valid data on the write/read bus
 7 pins in each direction
 If all data is aligned on 8 byte boundaries (+1 byte for ECC) then these pins are not needed
Address Bus: 16 pins
 To carry $Q_{to}$ for write_queue requests;
 To carry $Q_{from}$ for read_queue; prepend_and_move
 To carry Qvalues in different formats for both drop and prepend_and_move requests
AS: ADDRESS TRANSACTION STATUS (I): 2 pins
 Used to signal whether the status of the addresses carried for Qvalues
TS: TRANSACTION STATUS (I): 2 pins
 Transaction status of commands
RS: RESPONSE STATUS (O): 2 pins
 Transaction status of results
E: ERROR BIT (O): 1 pin Statistical Counters Application Specific Interface (ASI)

FIG. 3D illustrates the signals used in one implementation of a statistical counters ASI. In one embodiment, with a clock speed of 250 MHz, the statistical counters ASI of FIG. 3D allows up to 250 M counters to be updated per sec. No Length/BWE pins are needed as counter transactions are fixed length.

The following list defines the signals on the hardware-based counters ASI illustrated in FIG. 3D:

COMMAND TYPE (I): 3 pins
 To denote 5 different command types
  000—Raw Read
  001—Raw Write
  010—Change_Counter
  011—Set Counter
  100—Read_counter
COMMAND OPTION (I): 2 pins
 To denote
  Sign for change_counter (2 values)
   00—Positive
   01—Negative
  Read type for read_counter (3 values)
   00—Don't change value of counter
   01—Clear counter
   10—Set counter to default
DATA BUS (I and O): 18 pins
 Carries the payload of commands
 Wide width data can be sent in multiple clocks using TS pins
 To carry counter value for set_counter, change_counter
 To carry num counters for read_counters
 To carry results
 The data bus which returns results may be optional in the case that the results are read separately from a polling block
ADDRESS BUS (I): 24 pins
 To carry counter number
 Allows to address 16 million counters
TS: TRANSACTION STATUS (I): 2 pins
 Transaction status of commands
RS: RESPONSE STATUS (O): 2 pins
 Transaction status of results
E: ERROR BIT (O): 1 pin The embodiment of FIG. 3D presumes that 18 bits are sufficient for the change_counter command since the byte counter for a specific packet cannot be incremented by more than a jumbo size packet. Furthermore, it is expected that set_counter and read_counter need to transfer the complete counter value which can be as large as 72 bits. The data for such transactions with large amounts of data may be transferred over multiple clock cycles. Note that the "TS" bits (transaction status) are used to allow a transaction to use multiple clocks to transfer its data.

Semaphore Application Specific Interface (ASI)

FIG. 3E illustrates the signals used in one implementation of a semaphore hardware-based ASI. In one embodiment, with a clock Speed of 250 MHz, the semaphore ASI of FIG. 3E allows up to 250 M semaphore operations per second to be performed. Note that the Length/BWE pins are not needed as semaphore operations are fixed length operations.

The following list defines the signals on the hardware-based semaphore ASI illustrated in FIG. 3E:

COMMAND TYPE (I): 1 pin
 To denote 4 different command types
  000—Raw Read
  001—Raw Write
  010—Atomic_test_set_return_semaphore
  011—Atomic_exchange_semaphore
DATA BUS (I and O): 18 pins
ADDRESS BUS (I): 24 pins
 To carry semaphore number
 Allows up to 16M semaphore locations to be addressed
TS STATUS (I): 2 pins
TS STATUS (O): 2 pins
ERROR(O): 1 pin Network Memory Interface—Physical Layer As previously set forth, a preferred embodiment of the network memory system incorporates a second interface known as the network memory interface 243 to a network memory unit 250. The network memory interface 243 has been designed for in order to provide memory services at a high-speed. Each layer includes features designed to optimize the performance of the network memory interface 243 for providing memory services. Each layer of the network memory interface 243 will be examined in detail, starting from the lowest layer, the physical layer.

As previously set forth, the physical layer 235 of the network memory interface 243 may comprise any suitable high-speed bus. In one particular implementation, the network memory interface employs a high-speed serializer/deserializer interface commonly known as SERDES as illustrated in FIG. 3. A SERDES interface provides speed scalability up to 6 Gbit/s per pin pair (and even higher rates) on the network memory interface 243. The SERDES interface also greatly reduces the number of input/output pins needed by the network processor. With such high-speeds and a low pin-count, a SERDES interface can provide two to three times more bandwidth per pin as compared to typical memory interfaces (such as DRAM and SRAM based interfaces) today.

In one embodiment, the PCI Express implementations of the SERDES physical interface have been selected due to a number of advantages. The PCI express bus system has been standardized and is receiving a broad base of industry support. This will ensure that a wide variety of PCI Express circuits will become available and competition will create low costs. Furthermore, the PCI Express bus system provides number of additional communication features beyond simple serial data transfer such as data integrity with Cyclic Redundancy Check (CRC) protection, packet switching, failure detection, etc.

Figure 5A:
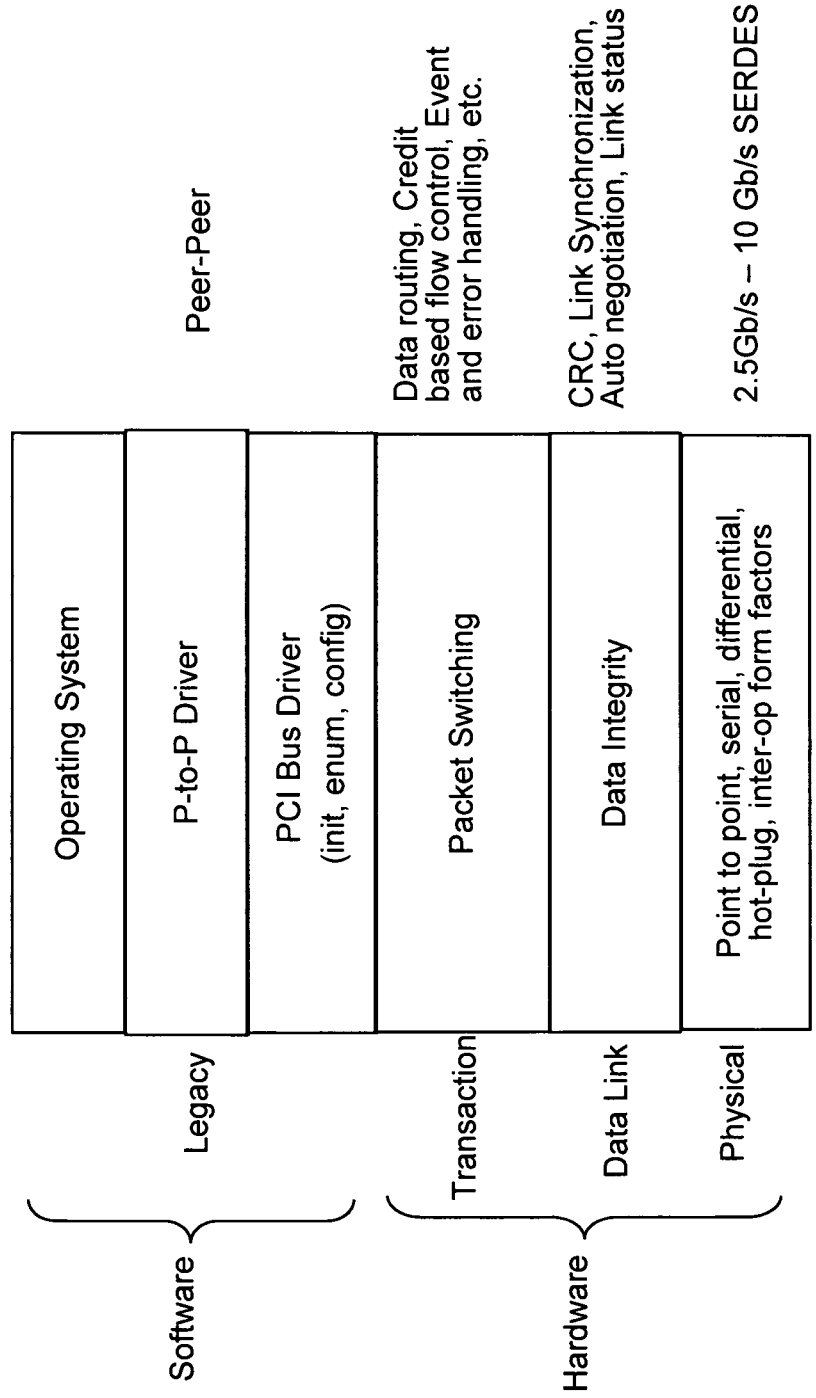
FIG. 5A graphically illustrates the communication stack used by the PCI Express bus.
Figure 5B:
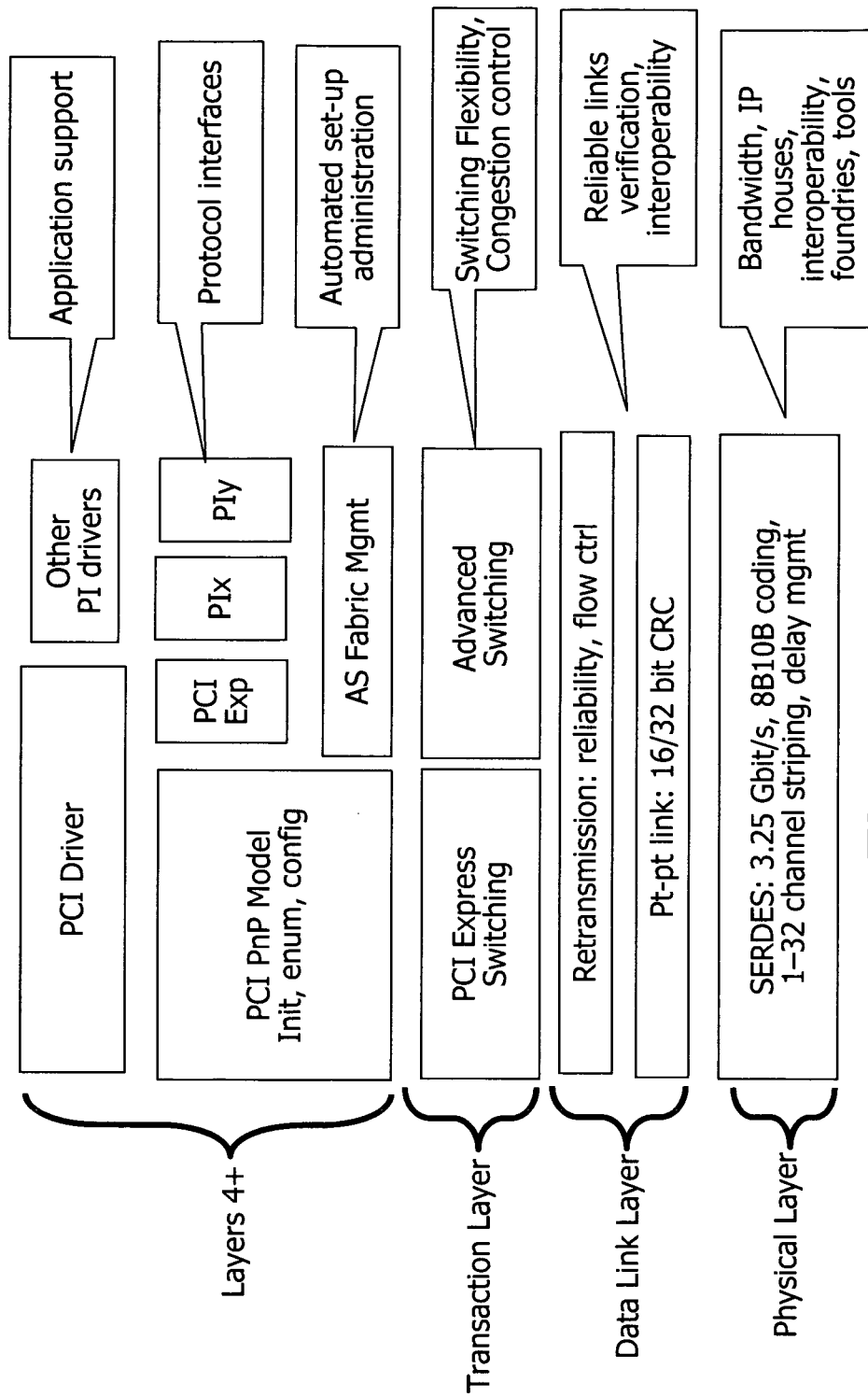
FIG. 5B illustrates the PCI Express bus communication stack with Advanced switching (AS).

FIG. 5A illustrates the communication stack of the PCI express bus used to carry legacy PCI bus traffic. However, the PCI Express bus system is being expanded for use in other applications with an Advanced Switching (AS) system that supports other applications. FIG. 5B illustrates the communication stack of the PCI express bus wherein Advanced Switching is supported in addition to legacy PCI bus traffic. Three different methods have been proposed for using the PCI Express bus system to carry a network memory protocol.

A first method of the using the PCI Express bus is to use the Advanced Switching Interface. FIG. 6 illustrates the communication stack of the PCI express bus used to carry network memory interface protocol over the Advanced Switching system. Using the AS interface would make the system similar the X.25 packet communication system wherein packets can be routed. In such an embodiment, the network memory protocol packets would be routed across PCI express (AS) infrastructure (switches, links). This method would provide around 25% inefficiency with 200 to 500 nanoseconds of latency. Such a system would be provide very good performance for statistical counter operations and table look-ups.

A second method of using the PCI Express bus is to start only at the Data Link Layer. FIG. 7 illustrates the communication stack of the PCI express bus used to carry network memory interface protocol using only the Data Link Layer and below of the PCI Express bus. Using only the Data Link Layer and below would make the system similar to the LAPB packet communication system that is only point-to-point with retransmission capabilities when errors are detected. This method would provide only 10% inefficiency with only 20 to 120 nanoseconds of latency. Such a system would be good for packet buffering and high performance table look-ups.

Figure 8:
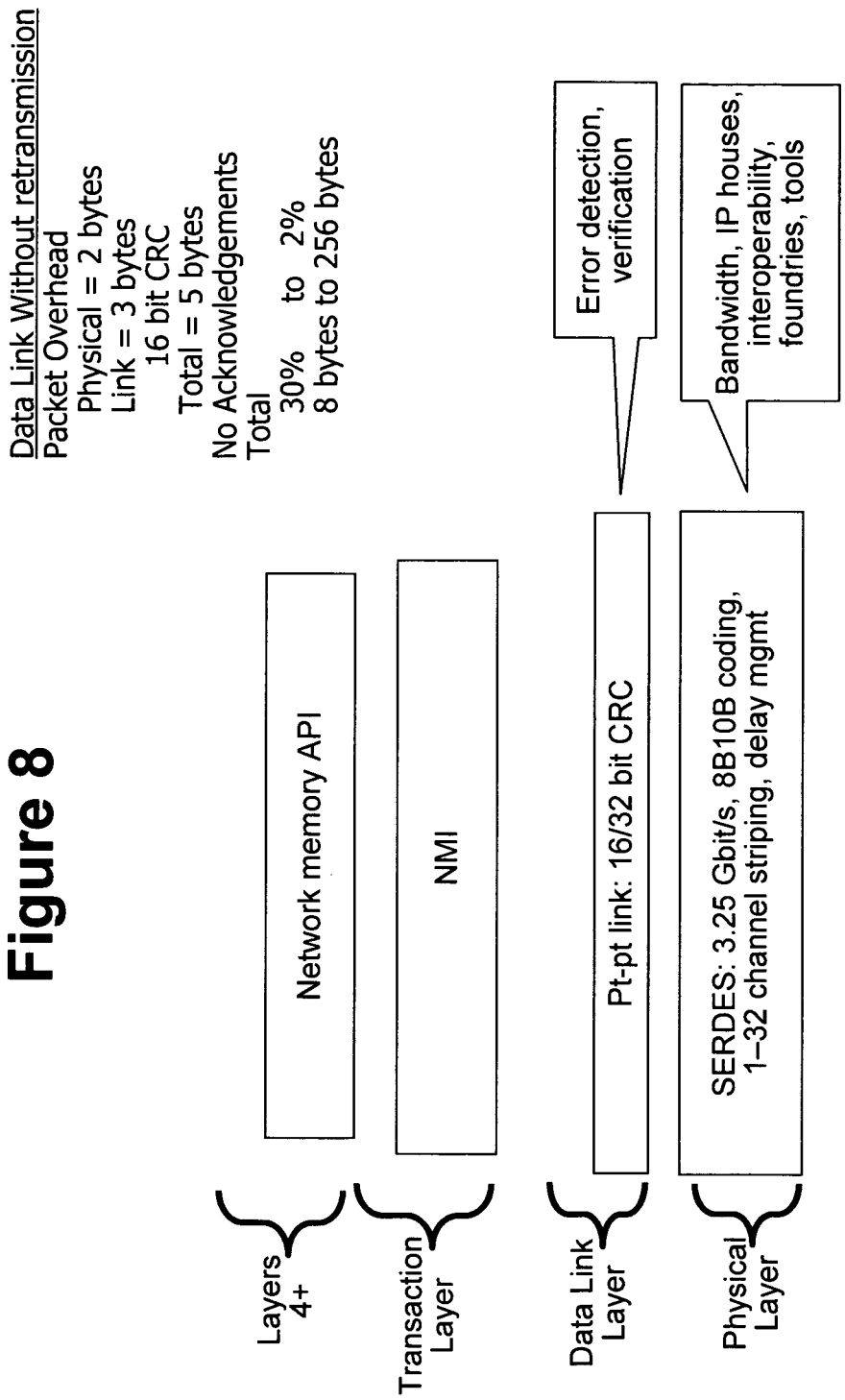
FIG. 8 illustrates a network memory interface implemented on the Data Link layer of a PCI Express communication stack without retransmission capability.

The third method of using the PCI Express bus would be to provide a very simple data link layer without retransmission capabilities that would be similar to the HDLC communication protocol. FIG. 8 illustrates the communication stack of the PCI Express bus used to carry network memory interface protocol using only the Data Link Layer and below of the PCI Express bus without any retransmission capabilities. This method of operation would sacrifice reliability for speed. This method would achieve a mere 5% inefficiency with only 5 to 120 nanoseconds of latency. This very lean implementation would provide excellent high-performance packet buffering and memory access speeds.

Figure 9:
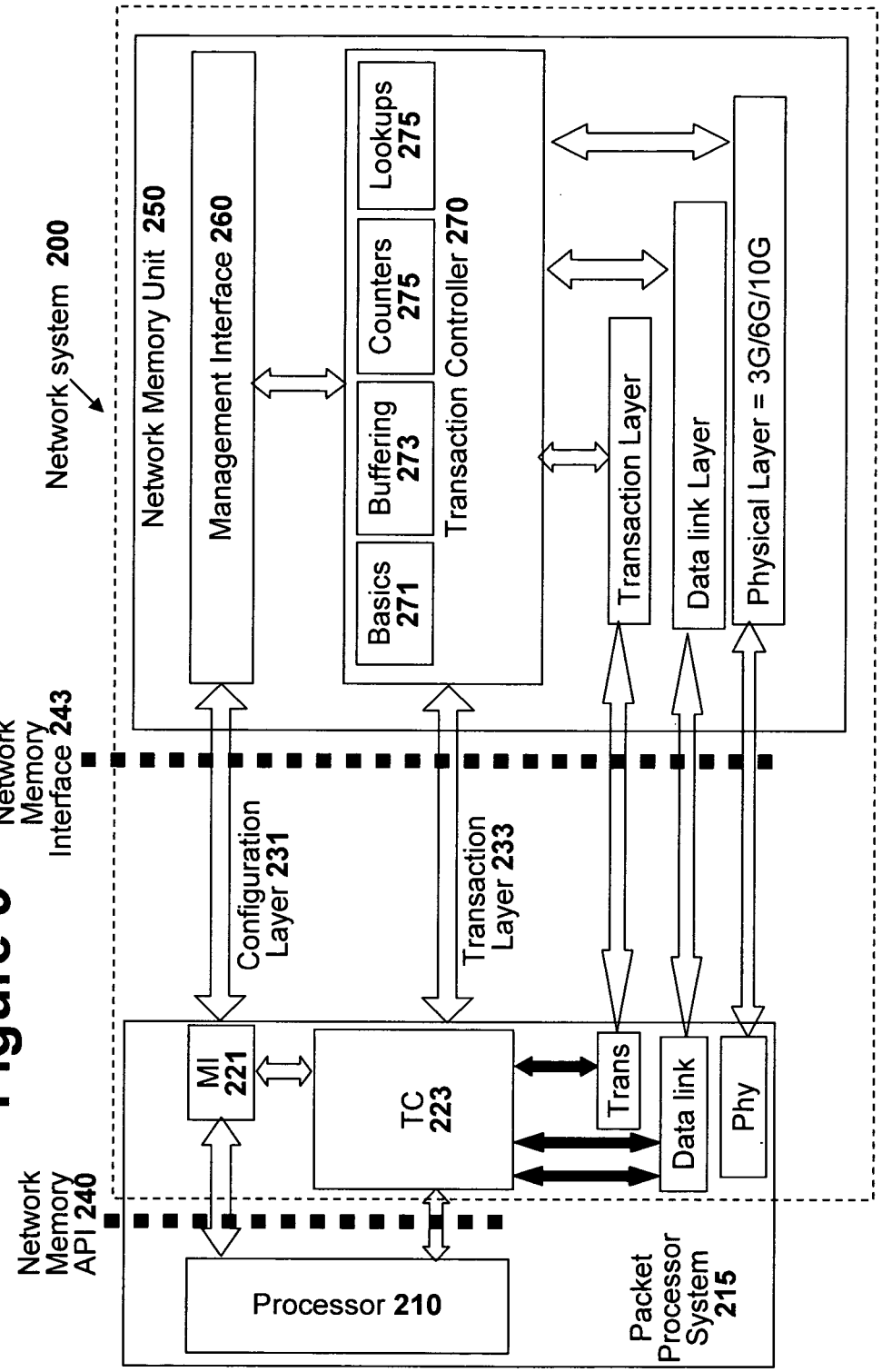
FIG. 9 illustrates the intelligent memory system of FIG. 2A with a PCI Express physical layer.

FIG. 9 illustrates all three different embodiments in the context of the network memory system of FIG. 2A. The embodiment that uses the transaction layer with the Advanced Switching would be good for networked applications wherein routing of the network memory protocol is required. The data link layer with retransmission could be used in applications with point to point communications and wherein moderate latency is acceptable. The data link layer without retransmission would be used wherein low latency is critical.

Network Memory Interface—Packet Format

Referring to FIG. 2A, the network memory interface 243 is a packet based communication system. Network memory requests received on the Network memory API 240 are encoded into packets that are transmitted across the physical layer 235 of the network memory interface 243 to the network memory unit 250. Response packets are encoded in the same manner by the network memory unit 250 and transmitted back to the modules that handle the network memory API 240.

Three different NMI packet formats have been defined. All three of these packet formats may potentially be used. Each different NMI packet format will be individually described. In all of the different packet formats, a first section describes an operation type and operation code along with operation control information, a second section describes fixed length parameters associated with the operation type and operation code specified in the first section, and the third section comprises a variable length parameter section that contains zero or more variable length parameters associated with the operation type and operation code specified in the first section. Note that specific bit lengths are provided in the accompanying figures, however different bit lengths may be used.

The Standard Packet Format

Figure 10:
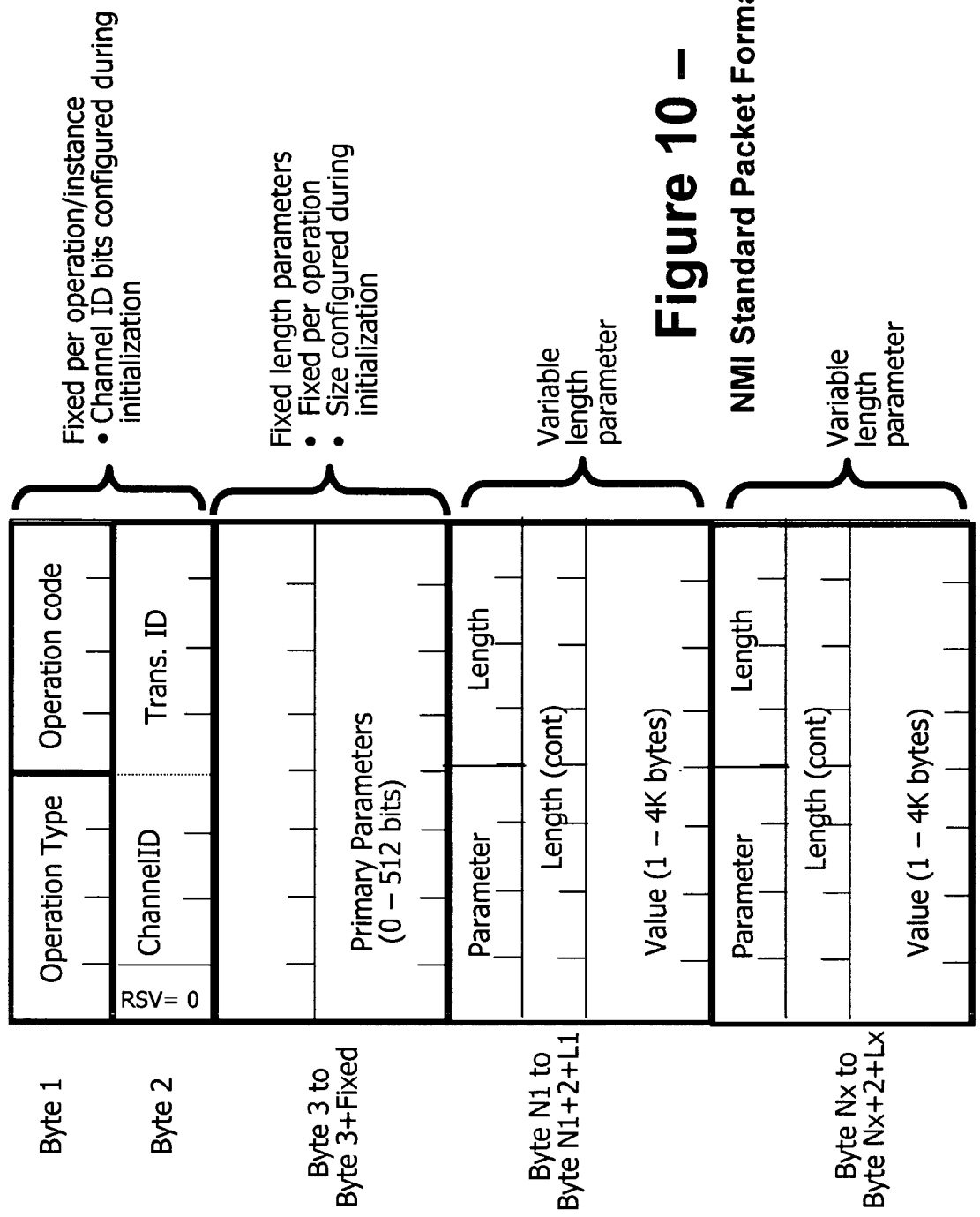
FIG. 10 illustrates a first packet format for encoding memory services requests.

FIG. 10 illustrates a first packet format known as the standard NMI packet format. The first section of the standard packet format is an operation type and operation code along with operation control information. Specifically, the first byte defines a memory service operation type (counter operation, buffering operation, etc.) and an operation command code that described a specific memory service operation (increment counter, read from buffer, etc.). As with all the packet formats, this first byte will define how the remainder of the packet will be formatted.

The operation control field of the standard packet format includes a channel identifier and a transaction identifier. The channel identifier identifies a particular logical 'channel' in the network memory unit such that multiple different entities that require memory services can use a single network memory unit by specifying different logical channels. The transaction identifier identifies a particular transaction. The transaction identifier allows multiple transactions of the same operation type and operation code to be outstanding by assigning different transaction identifiers to each transaction. Note that the bit border between the channel identifier and the transaction identifier is not fixed such that it may be configured as needed for a particular application.

The second section of the standard packet format is a fixed length parameter field. The fixed length parameter field contains all of the fixed length parameters associated with the operation type and operation code specified in the first section. The order and size of each fixed length parameter is dependent on the operation type and operation code specified in the first section. Examples of fixed length parameters that may be contained in the fixed length parameter field include Counter identifiers, Queue identifiers Address Finally, the third section of the standard packet format is a set of variable length parameters. The variable length parameter field contains all of the variable length parameters associated with the operation type and operation code specified in the first section. Note that each variable length parameter specifies a parameter identifier and a length of the parameter. The variable length parameters that may appear are dependent on the operation type and operation code specified in the first section.

The Simple Packet Format

Figure 11:
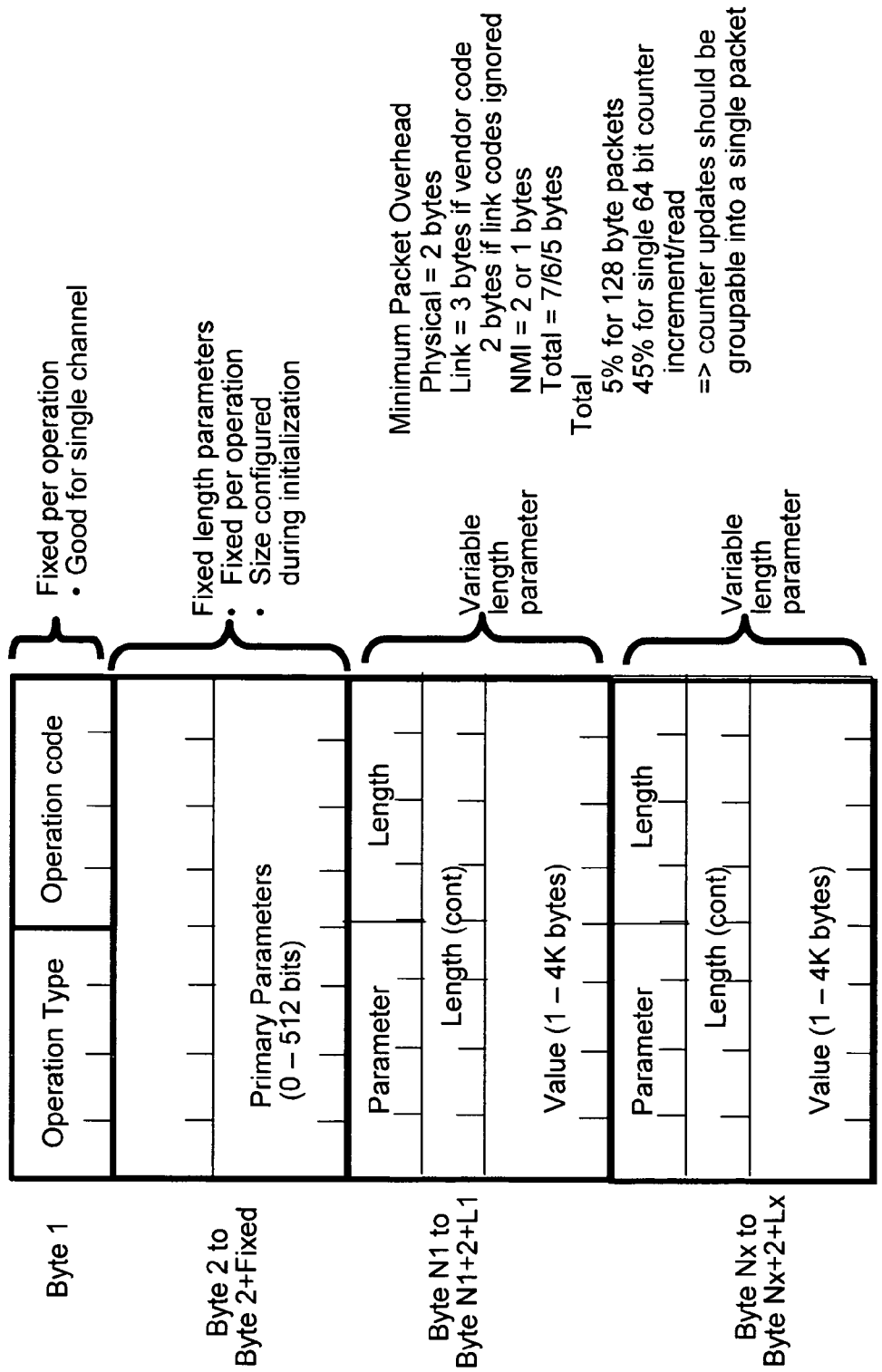
FIG. 11 illustrates a second packet format for encoding memory services requests that is a simplified version of the packet format in FIG. 10.

FIG. 11 illustrates a first packet format known as the simple NMI packet format. The first section of the simple packet format contains an operation type and operation code just like the standard packet format. However, there is not additional operation control information. The remainder of the simple packet format is similar to the standard packet format. Specifically, the remainder of the packet contains a fixed length parameter field and a set of variable length parameters. Thus, the simple packet format differs from the standard packet format only in that no channel or transaction identifiers are used.

The Standard Packet Format with Sequence

Figure 12:
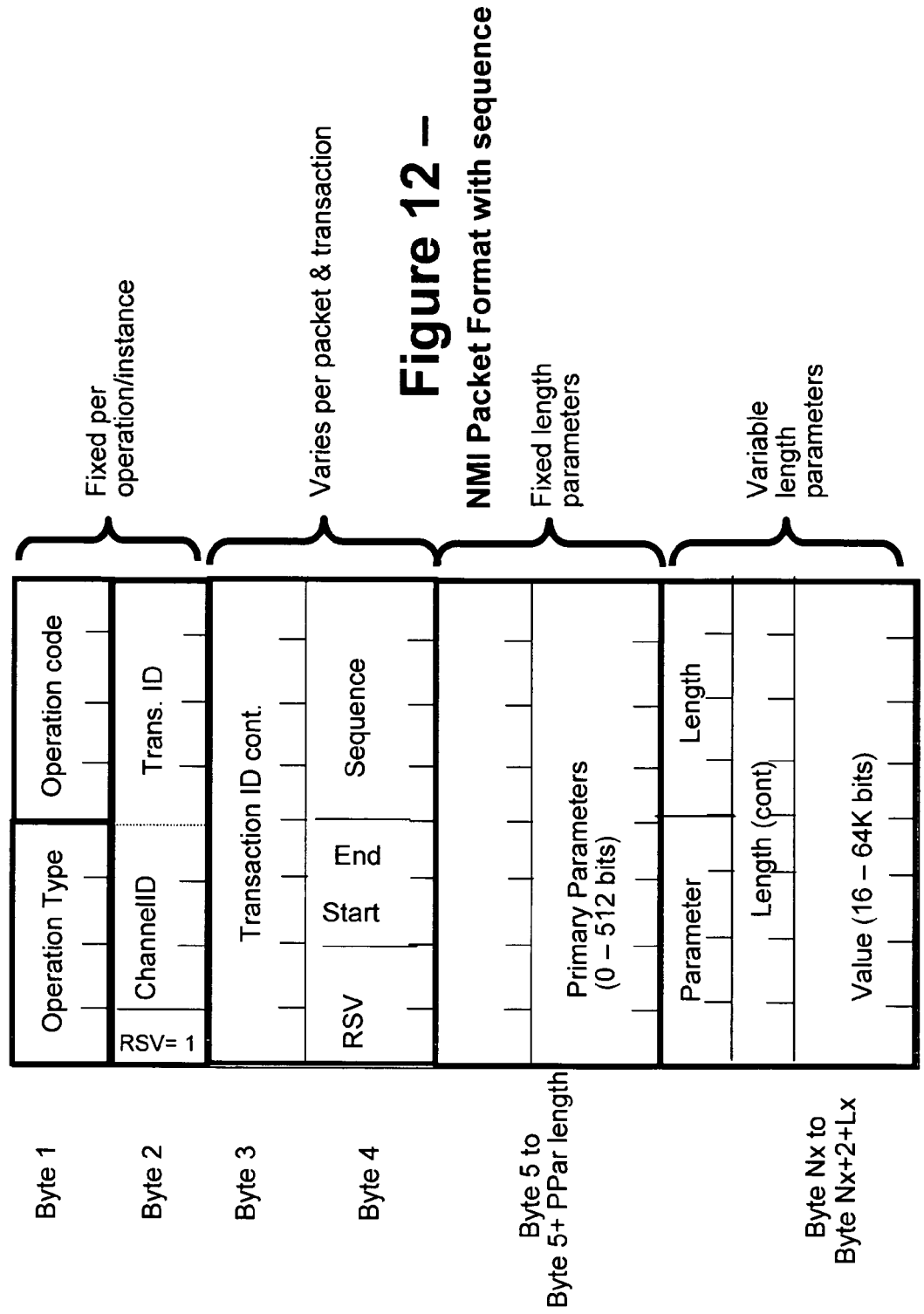
FIG. 12 illustrates a second packet format for encoding memory services requests of FIG. 10 with added sequence information.

FIG. 12 illustrates a first packet format known as the packet format with sequence. The first section of the simple packet format contains an operation type, operation code, channel identifier, and transaction identifier to the standard packet format. However, there is additional operation control information in the first section of the packet format with sequence. First, the transition identifier is larger. Thus a larger number of transactions may be outstanding. Second, the packet format with sequence includes sequence information (as would be expected). The sequence information allows the processor/ASIC which is receiving results, to confirm that packets are received correctly and in sequence.

The remainder of the packet format with sequence is the same as the standard packet format. Specifically, the remainder of the packet contains a fixed length parameter field and a set of variable length parameters. Thus, the simple packet format differs from the standard packet format only in that no channel or transaction identifiers are used.

Network Memory Interface—Transaction and Configuration Layers

Each of the NMI packets is encoded with NMI transaction information for a specific transaction. In general, the NMI packets form a request and response system. Requests to the network memory unit may comprise configuration commands or specific memory transaction commands. The response packets that are received back from the network memory unit specify success or failure of the request and any the response information that was requested.

Figure 13:
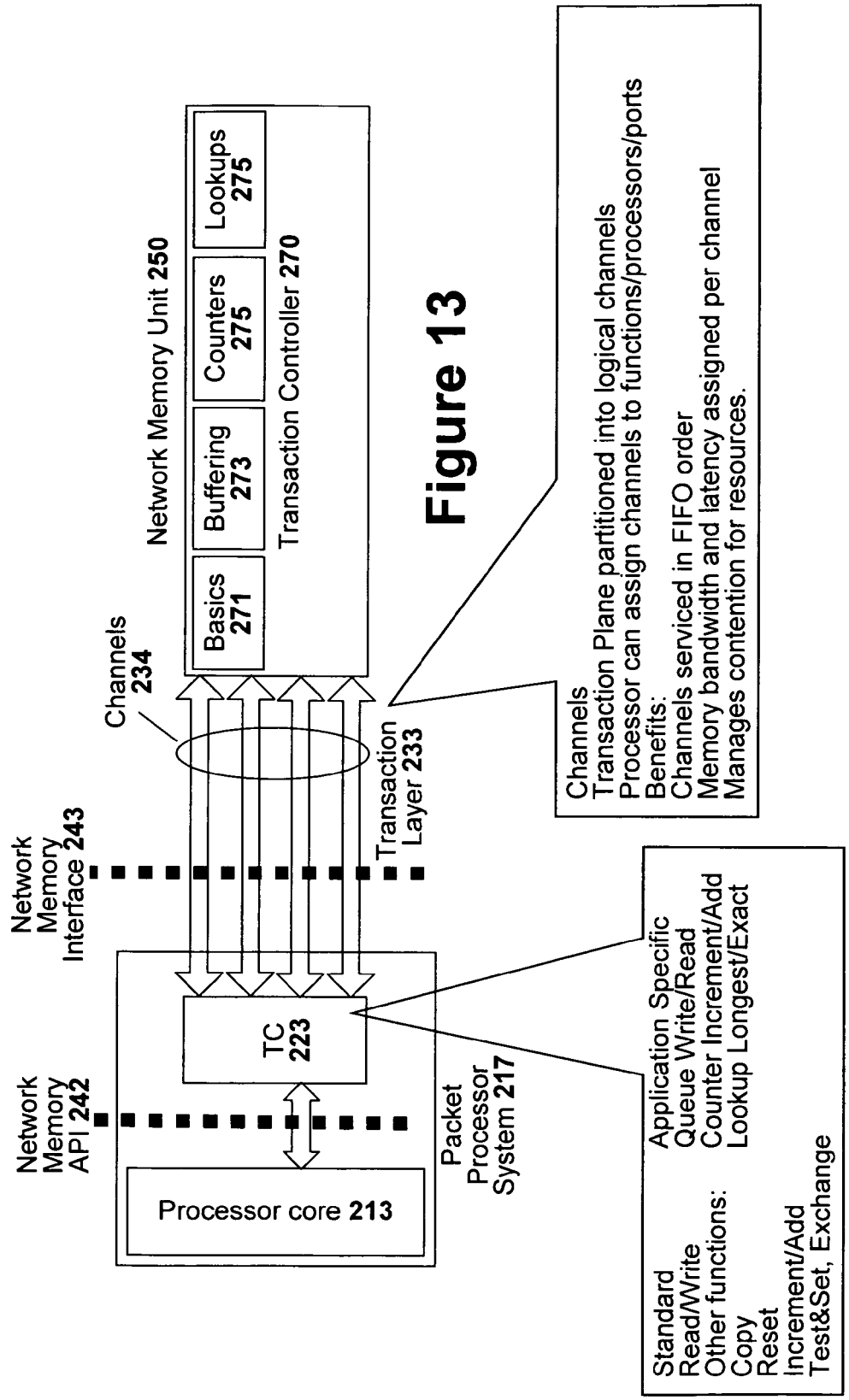
FIG. 13 illustrates a more detailed view of the transaction layer of FIG. 2A.

FIG. 13 illustrates a more detailed view of the transaction layer 233. Note that the transaction layer can be viewed as a set of separate channels as defined in the standard packet format of the previous section. The various different transaction channels may be assigned to different functions, processors, or ports in a network device. The memory bandwidth and read latency may be assigned per channel basis. Thus, the channel system helps manage contention for resources.

There are a large number of different memory service operation types and specific memory operations are supported. A raw memory operation type includes read, write, copy and reset operations. A semaphore memory service type includes set, test & set, and exchange operations. A FIFO queue buffering (useful for packet-buffer) memory service type includes write to queue and read from queue operations. A statistics counter memory service type includes set, increment, add, read, and reset operations. A table look-up memory service type includes operations for selecting the largest item in a table, selecting an exact item in a table, a longest prefix match operation, and a number of other look-up operations.

The NMI packet format is a very generic format that allows many different operations to be defined. Furthermore, the NMI packet format is not fully mapped out such that it is easily expandable. The higher-level API (implemented usually as a software-based API) is the interface normally used by a designer. The memory service operations described below will be described with reference to associated API commands for accessing the memory services. The API commands all map to associated NMI packets that can be used to carry the memory service request across the NMI interface.

FIFO Queue Buffering Operation Type

Probably the most important type of memory service type for network applications is a First-In First-Out (FIFO) queue buffering memory service type. The FIFO queue buffering type of commands will be used for packet buffering. By providing high-level FIFO queue operations, the network memory system eliminates the need for a network processor to maintain linked lists, free memory lists for queues, and pointer management.

An ideal set of FIFO queue buffering operations would provide a wide set of features that would enable many different types of FIFO queue buffering. For example, both unicast and multicast buffering should be supported. Furthermore, the FIFO queue buffering should support both variable length element (packet) buffering and fixed-size element (cell) buffering. The ability to buffer complete or incomplete FIFO elements at time of buffering would be very useful. Furthermore, it would be beneficial to be able to buffer an element without immediately having the logical queue number. Additional features to support include multicasting by queue bitmap, linked list, multicast group, packet tail drop, packet head drop, CRC drop, among others.

In one particular embodiment, a set of four buffering operation types (in addition to the buffering configuration) was found to provide all of the above features. The follow list contains those four FIFO queue buffering operations. Note that in this document, the term packet may be used interchangeably with the term element since most FIFO queues will contain packets in a network application. The following list presents an Application Programming Interface (API) for FIFO queue operations Write_queue($Q_{to}$, SegmentType, D)
    Write a packet or cell (D) to the tail of a queue ($Q_{to}$),
    $Q_{to}$=The queue identifier
    SegmentType=allows large packets to be written in multiple parts, and conveys packet boundaries
        SegmentType 0—Does not have the end of a packet
        SegmentType 1—Contains end of packet
    D=Variable length (packet) or fixed length (cell) element
    Default response: No response
Read_queue($Q_{from}$, ReadType)
    Reads a packet or cell (D) from the head of a queue ($Q_{from}$)
    $Q_{from}$=The queue identifier
    Read Type=Destructive or non destructive read
    Default response: Response which returns packet data
    Response format:
        Same format as write queue.
        Data is returned in as many chunks as needed with packet end/no end being specified
Prepend_and_move($Q_{from}$, MoveType, {QListType, [$Q_1$ ... $Q_n$]}, <H>)
    Allows data to be written temporarily to a queue and later pre-pend a new header onto the packet and move the packet to another queue. Specifically, packet is moved from the head of a temporary queue ($Q_{from}$), then optional header <H> is inserted into the packet, and the newly formed packet (with the new header if specified) is written to one or more queues specified by in the queue list [$Q_1 \ldots Q_n$]
$Q_{from}$=The queue identifier
MoveType=can be destructive or non-destructive
QListType=specifies the format of the destination queue(s) format
    Can be a bitmap, list of queues, pointer to a multicast group or null queue, all queues (i.e. broadcast)
[$Q_1 \ldots Q_n$]=Queue list of type specified in QListType
H=is the optional header which is to be pre-pended;
Drop({QListType, [Q0 ... Qn]}, DropType, NumPackets)
    Drop elements from a FIFO queue.
    QListType=specifies the format of the destination queue(s) format
        Can be a bitmap, list of queues, pointer to a multicast group null queue, all queues
    [$Q_1 \ldots Q_n$]=Queue list of type specified in QListType
    DropType=Types 0, 1, 2, 3: Drop head packet, drop tail packet, drop all
    NumPackets—Number of packets to be dropped from queue The Read_Queue, Write_Queue, and Drop operations are relatively straightforward. However, the Prepend_and_move operation is non trivial and requires further explanation. The Prepend_and_move operation allows for sophisticated FIFO element header and FIFO queue manipulation. The following sophisticated queuing operations can be performed with the Prepend_and_move operation:
Multicast Write
    For same multicast packet to all queues, make H=NULL
    For different headers for multicast packet, send separate headers for pre-pending
Commit/Non Commit
    Temporary queue useful to hold packet which may later be committed or not
    Make MoveType=destructive and
        Qlist=NULL, H=NULL to not commit/discard; or
        Specify valid Qlist to commit
Move Queue Only
    Useful to buffer data when queue number is not known immediately
Pre-Pend Header
    Useful when the head tag of a packet is created later.
    Set QlistType=RealQueue and pre-pend "header tag" to the beginning of an existing packet As previously set forth, the four FIFO queue buffering operations specified allow for a wide variety of types of FIFO queue buffering to be performed. The following examples illustrate how different types of queuing may be performed.

The most simple type of FIFO queuing is unicast queuing. Unicast queuing occurs when each element is only read only once. The following commands may be used to perform unicast queuing when the queue identifier is known when element arrives and a complete element is buffered:
    Write_queue($Q_{to}$=Q, Type=EOP, D) (i.e. end of packet)
    Read_queue($Q_{from}$=Q, ReadType=destructive)

To performing unicast queuing when the queue identifier known when fully complete element is available but the element is written in multiple parts since element may be very large
    Write_queue($Q_{to}$=Q, Type=not EOP, D0)
    Write_queue($Q_{to}$=Q, Type=not EOP, D1)
    Write_queue($Q_{to}$=Q, Type=not EOP, DLast) (i.e. end of packet)
    Read_queue($Q_{from}$=Q, ReadType=destructive)

If in the preceding example, the most recently added element must be removed (for example, a packet may be dropped when a CRC error is found), the following operations may be performed:
    Write_queue($Q_{to}$=Q, Type=not EOP, D0)
    Write_queue($Q_{to}$=Q, Type=not EOP, D1)
    Drop (QListType=ListofQueues, Q, DropType=DropTail, NumPackets=1) (i.e. discard current packet at the tail of the queue)

To perform unicast queuing when the queue identifier is known when packet arrives but the packet header will not be available until later then the following commands may be issued:
    Write_to_queue($Q_{to}$=TempQueue, Type=not EOP, D)
    Write_queue($Q_{to}$=TempQueue, Type=not EOP, D)
    ...
    Write_queue($Q_{to}$=TempQueue, Type=EOP, D)
    Prepend_and_move ($Q_{from}$=TempQueue, MoveType=Destructive, {QlistType, $Q_{to}$}, H)
    Read_queue($Q_{from}$, ReadType=destructive)

If neither the queue identifier is known nor is the packet header available when the packet arrives, then the previous steps may be used except that a temporary queue is used to buffer the packet payload temporarily. Later, when the queue identifier becomes known then the packet is "moved" to the correct queue.

One way to perform multicast queuing is by keeping multicast packets in a specific multicast queue(s). Then a queue element may be read a number of times and is not removed until the last of multiple recipients reads the queue element. The following operations may be performed to write a packet to a multicast queue and then read from the queue once for each recipient of the multicast:
    Write_queue($Q_{to}$=Q, Type, D)
    Read_queue($Q_{from}$=Q, ReadType=non-destructive),
    Read_queue($Q_{from}$=Q, ReadType=non-destructive), ...
    Read_queue($Q_{from}$=Q, ReadType=destructive)

If the destination queue of a multicast packet is not immediately known or the entire packet is not yet available immediately at the time of arrival, then the same techniques described in the unicast section above may be applied.

However, the headers of multicast packets can introduce some difficulties. Specifically, the headers for different multicast queue groups may need to be different. To accommodate such a situation, the following operations may be used:
    Write_to_queue($Q_{to}$=TempQueue, Type, D)
    Prepend_and_move($Q_{from}$=TempQueue, non-destructive, $H_1$, Q-list, [$Q_{to}$ ... ])
    Prepend_and_move($Q_{from}$=TempQueue, non-destructive, $H_2$, Q-list, [$Q_{to}$ ... ])
    ...
    Prepend_and_move($Q_{from}$=TempQueue, destructive, $H_N$, Q-list, [$Q_{to}$ ... ])
    Read_from_queue($Q_{from}$, Destructive)
wherein $H_1, H_2, \ldots, H_N$ are different headers written for a multicast packet being written to different multicast groups. Note that depending on the configuration of the network memory unit, packets may be copied or pointers to a single copy of the packet are created for multicasting.

FIFO Queue Buffering Configuration

As set forth in FIG. 2A, a configuration layer 231 is used to communicate configuration information. The configuration information is used to allocate the resources of the network memory unit 250. A configuration 'compiler' may be used to examine a configuration to determine if the configuration is possible, and if so, how the configuration information should be formatted. Examples of formatted configuration information include downloadable firmware, a set of configuration packets, or a set of register settings.

Each different type of memory service has its own particular configuration requirements. Thus, each type of memory service has a set of configuration information. In one embodiment, a generic object-oriented interface is for configuration. Specifically, resources are categorized into different 'classes' and each class has its own associated attributes and parameters. The following list provides an example of a generic object oriented configuration system that may be used:

Create_Instance* (Instance Number, InstanceClass)
    Set_Attribute (InstanceNumber, InstanceParameter, InstanceValue)

The following list contains one possible list of instance parameters for a FIFO buffering queue class:

Number of Queues=The number of different FIFO queues to create.
    BufferSize=The size of the FIFO queue.
    Memory Allocation Type=The manner in which memory is allocated.
        Type 0, 1, 2, 3: Static, Dynamic, Combination, Page Based
    Addressing Type=The manner in which the FIFO queues are addressed.
        Memory mapped, logical
    Access Type=The manner in which the queues are accessed
        Type 0: Word Mode (100% cache hit)
        Type 1: Variable Mode (Statistical Buffering with small chance of cache miss)
    Read-Characteristic=Defines what happens when a read is issued by the transaction API
        Type 1: Return complete packet from queue
        Type 2: Get exactly b bytes from queue, where b is the read segment size
        Type 3: Return up to b bytes from queue until packet boundary
        Type 4: Return b or more bytes from queue until packet boundary
    ReadSegmentSize=Specifies the value of b, the size of reads from queue
    Multicast-Type=The manner in which multicast queues are handled.
        Type 0: Use pointer to single copy of multicast packet
        Type 1: Keep multiple data copies of multicast packet for each queue to which it belongs to For example, the following list configuration commands may be used to create a set of logically-addressed 4 Gigabit FIFO queue for packet-buffering with 8000 queues.

Create_Instance* (Instance Number=1, InstanceClass=PacketBuffering)
    Set_Attribute (InstanceNumber=1, InstanceParameter=BufferSize, InstanceValue=4 Gb)
    Set_Attribute (InstanceNumber=1, InstanceParameter=NumberofQueues, InstanceValue=8000)

Additional configuration values should be specified to describe the specific requirements of the packet buffering memory sub-system. A network memory system compiler will receive the set of configuration commands and output whether a specific network memory unit (i.e. a specific version of a chip) can support a requested configuration or not.

Counter Operation Type

Network devices generally maintain a large number of statistics counters in order to monitor the performance of the network and the network device. These counters may be modified very frequently such as on a per-packet basis. The counters are generally read out on a much less frequent basis. Thus, a set of memory operations has been created to efficiently address the high-speed statistical counter requirements of a network device.

The counter operations have been designed to optimize counter performance. Thus, the two memory accesses of a standard read-modify-write cycle have been reduced to a single counter operation. Similarly, the multiple memory accesses required for very wide counters has been reduced to a single counter operation.

To provide a wide variety of counter services, a rich feature set of counter operations is needed. For basics, a counter service should provide for the ability to set, read, add, subtract, increment, and decrement counters. Those features should be available for handling one or more counters simultaneously. The counters should be addressable by a memory address or by a logical counter number. Advanced counter features would include special packet operations and byte counter pairs. In one embodiment, the counter system allows for the auto-increment of packet counter in a paired counter. Compound counter operations would further enhance the counter system such that compound read & clear and read & reset to value operations are provided.

In one embodiment, a mere three different counter operations can provide all of the features described above. The following list provides an API for three counter operations:

Change_counter (CntID, Sign, Value)
        Adds or subtracts 'value' from a counter
        CntID=counter identifier that may be a counter number or virtual memory address
        Sign=specifies whether it is positive or negative value
        Value=the amount to change the counter
    Set_counter(CntID, Value)
        Set a counter to a specific value.
        CntID=counter identifier of counter to set
        Value=the amount to set the counter to.
    Read_counter(CntID, ReadType, NumCounters)
        Sets a specified counter or counters.
        CntID=counter identifier of counter to set
        ReadType: This specifies what should happen to the counter after a read.
            Various possibilities include:
                Nothing=Do not change the value of the counter
                Clear counter—Set the counter to zero
                Set counter to default—Set counter to a default value In an alternate embodiment, a number of optional counter operations are also provided. The following list contains a set of optional counter operations that allow for optimization of the previous commands:

Increment_counter (CntID)
        Increment the specified counter, no value need.
    Decrement_counter(CntID)
        Decrement the specified counter.
    Clear_Counter(CntID)
        Sets counter to zero
    Restore_Default_Counter(CntID)
        Sets counter to default value
    Change counters(CntID1, Sign1, Value1, . . . ,)

The following list contains one possible list of instance parameters for a statistical counters class:
Number of Counters=Number of counters to allocate (up to 2.5 M)
Width of Complete Counter=Width of each counter (up to 72 bits)
Addressing Type=method of addressing counters
Memory mapped, logical
Start Identifier=This specifies the identity of the first counter. Typically, it will be set to zero such that the first counter is referred to with the identifier zero, the next counter is referred to with the identifier one, and so on.
Counter Access Type=How counters are stored in memory.
Cached=Implemented using caching algorithm
Uncached=Implemented using memory
Counter Structure Type=The type of counters
Single—There is a single counter
Paired—There is a paired counter consisting of a packet and byte counter; packet counter is auto-incremented
Counter Structure=Describes the way in which a counter is portioned. E.g.: A 72 bit counter may consist of a 32 bit packet counter and 40 bit byte counter format to specify counter structure. (<Sub-counter-number-1, Length in Bits of sub-counter-32, Initial Value-0> <2, 40, 0>)
Semaphore Operation Type Many applications require semaphores in order to enforce database coherency and resource allocation without deadlock. A network memory unit may provide semaphore services. One embodiment of NMI based semaphores uses only two operations. The following presents an API for addressing the two semaphore operations:
Atomic_test_set_return_semaphore (Semaphore ID, Value)
Test if current value is zero, set SemaphoreID to value if current value is zero, and return previous value. These operations are performed atomically
SemaphoreID=identifier of the desired semaphore.
Value=The value to set the semaphore if its previous value was zero.
Atomic_exchange_semaphore (Semaphore ID, Value)
Write specified value to semaphoreID and read previous value. The above operations are performed atomically
SemaphoreID=identifier of the desired semaphore
Value=The value to write to the semaphore.
The following list contains one possible list of instance parameters for a semaphore class:
Physical Start Address—0x0000
Number of Semaphores=Number of Semaphores to allocate (up to 2.5 M)
Width of Semaphore=Width of each Semaphore (up to 72 bits)
Addressing Type=method of addressing semaphores
Memory mapped, logical
Start Identifier=This specifies the identity of the first semaphore. Typically, it will be set to zero such that the first semaphore is referred to with the identifier zero, the next semaphore is referred to with the identifier one, and so on.
Semaphore Default Value=The default value for the semaphore, typically 0.
Raw Memory Operation Type The network memory system allows conventional "raw" memory accesses to be performed. Specifically, the network memory system provides commands to perform raw reads and writes on memory. This allows for backward compatibility to existing memory sub-systems. Ideally, the raw memory system would further include special commands to optimize reads, optimize writes, read a number of locations, and write to number of locations.

In one embodiment, the simple raw memory access operations are provided with only two commands. The following list describes the API for the two raw memory operations:
Read_location(Address, Number)
Address=Raw memory address.
Number=Number of memory locations to read.
Write_location(Address, Number, Value)
Address=Raw memory address.
Number=Number of memory locations to write to.
Value=Value to write to specified memory locations.
To provide more efficient raw memory access features described above, the following optional raw memory access commands may also be implemented:
Memcopy_range_oflocations (Address-Start, Address-Destination, Number)
Copy all values from (Address-Start, Address-Start+Number to (Address-Destination, Address-Destination+Number)
The following list contains one possible list of instance parameters for a raw memory operation class:
Physical Start Address=Address of first memory location, typically 0x0000.
Number of Locations=Number of Memory Locations to allocate (up to 2.5 M)
Width of locations=Width of each memory location, typically 32 bits.
Addressing Type=method of addressing memory locations
Memory mapped, logical
Start Identifier=This specifies the identity of the first memory location. Typically, it will be set to zero such that the first location is referred to with the identifier zero, the next location is referred to with the identifier one, and so on.
Default Value=The default value for the memory locations, typically 0.

The foregoing has described a number of techniques for implementing an intelligent memory system interface. It is contemplated that changes and modifications may be made by one of ordinary skill in the art, to the materials and arrangements of elements of the present invention without departing from the scope of the invention.

We claim:

1. A high-speed computer memory subsystem implemented within a network device, said high-speed computer memory subsystem for providing memory services to a network processor, said computer memory subsystem comprising:
a high-speed interface comprising a Peripheral Component Interconnect (PCI) express bus;
wherein a first end-point of the PCI express bus is connected to the network processor, and a second end-point of the PCI express bus is connected to a network memory unit, said network processor being separate from said network memory unit;
a memory services protocol for said high-speed interface, said network processor using said memory services protocol to make memory service requests for more than one type of memory operation to said network memory unit, said memory operations including counter operations and First-In First-Out queue operations wherein the memory services protocol is carried by the PCI express bus; and a memory logic coupled to said high-speed interface, said memory logic processing and responding to memory service requests specified in said memory services protocol.

2. The computer memory subsystem as claimed in claim 1 wherein said memory services protocol defines memory service request packets for said memory operations.

3. The computer memory subsystem as claimed in claim 2 wherein said memory service request packets comprise an operation code, a set of fixed length parameters if required for said operation code, and a set of variable length parameters if required for said operation code.

4. The computer memory subsystem as claimed in claim 2 wherein said memory service request packets comprise an operation code and a channel identifier such that multiple channels of memory services may be provided.

5. The computer memory subsystem as claimed in claim 2 wherein said memory service request packets comprise an operation code and a transaction identifier such that multiple memory service requests may be outstanding.

6. The computer memory subsystem as claimed in claim 1 wherein said high-speed interface comprises a dedicated hardware interface.

7. The computer memory subsystem as claimed in claim 6 wherein a memory service request received on said dedicated hardware interface is translated into a packet-based memory request sent on a serial bus.

8. The computer memory subsystem as claimed in claim 1 wherein said memory operations further comprise semaphore operations.

9. The computer memory subsystem as claimed in claim 1 wherein said memory operations further comprise table look-up operations.

10. The computer memory subsystem as claimed in claim 1 wherein said memory operations further comprise raw memory operations.

11. The computer memory subsystem as claimed in claim 1 wherein said counter operations include reset counter and increment counter operations.

12. The computer memory subsystem as claimed in claim 1 wherein said First-In First-Out queue operations include add to queue and remove from queue operations.

* * * * *